(12) United States Patent
Polcak et al.

(10) Patent No.: US 10,816,807 B2
(45) Date of Patent: Oct. 27, 2020

(54) INTERACTIVE AUGMENTED OR VIRTUAL REALITY DEVICES

(71) Applicant: VRGINEERS, INC., Dover, DE (US)

(72) Inventors: Marek Polcak, Brno (CZ); Milan Kostilek, Nova Role (CZ); Martin Chloupek, Prague (CZ); Tomas Jirinec, Prague (CZ)

(73) Assignee: VRGINEERS, INC., Dover, DE (US)

( * ) Notice: Subject to any disclaimer, the term of this patent is extended or adjusted under 35 U.S.C. 154(b) by 60 days.

(21) Appl. No.: 16/177,111

(22) Filed: Oct. 31, 2018

(65) Prior Publication Data

US 2019/0129181 A1   May 2, 2019

Related U.S. Application Data

(60) Provisional application No. 62/580,203, filed on Nov. 1, 2017.

(51) Int. Cl.
*G06T 19/00* (2011.01)
*G02B 27/01* (2006.01)
*G02B 27/00* (2006.01)
*G02B 27/09* (2006.01)

(52) U.S. Cl.
CPC ..... *G02B 27/0172* (2013.01); *G02B 27/0093* (2013.01); *G02B 27/017* (2013.01); *G02B 27/0955* (2013.01); *G06T 19/006* (2013.01); *G02B 2027/014* (2013.01); *G02B 2027/0138* (2013.01); *G02B 2027/0187* (2013.01)

(58) Field of Classification Search
None
See application file for complete search history.

(56) References Cited

U.S. PATENT DOCUMENTS

| 7,852,355 | B2 * | 12/2010 | Friedrich | G06F 3/012 |
| | | | | 345/632 |
| 8,345,066 | B2 * | 1/2013 | Moritz | G06F 3/011 |
| | | | | 345/633 |
| 8,786,675 | B2 | 7/2014 | Deering | |
| 8,965,460 | B1 | 2/2015 | Rao et al. | |
| 10,394,040 | B2 * | 8/2019 | Gollier | G02B 27/283 |
| 2009/0256904 | A1 | 10/2009 | Krill et al. | |
| 2009/0262074 | A1 | 10/2009 | Nasiri et al. | |
| 2011/0169928 | A1 | 7/2011 | Gassel et al. | |
| 2013/0077049 | A1 | 3/2013 | Bohn | |
| 2013/0335573 | A1 | 12/2013 | Forutanpour et al. | |
| 2014/0160129 | A1 * | 6/2014 | Sako | G06F 3/011 |
| | | | | 345/427 |
| 2014/0306866 | A1 | 10/2014 | Miller et al. | |
| 2015/0038227 | A1 | 2/2015 | Loose et al. | |
| 2015/0234508 | A1 * | 8/2015 | Cho | G06T 19/006 |
| | | | | 345/173 |
| 2015/0243078 | A1 * | 8/2015 | Watson | A63F 13/54 |
| | | | | 345/547 |
| 2016/0004298 | A1 * | 1/2016 | Mazed | G06F 3/011 |
| | | | | 345/633 |
| 2016/0116979 | A1 | 4/2016 | Border | |
| 2016/0198949 | A1 | 7/2016 | Spitzer | |
| 2016/0292924 | A1 * | 10/2016 | Balachandreswaran | |
| | | | | A63F 13/212 |
| 2017/0161881 | A1 * | 6/2017 | Najaf-Zadeh | H04N 21/816 |
| 2017/0161951 | A1 | 6/2017 | Fix et al. | |
| 2017/0236330 | A1 * | 8/2017 | Seif | G06T 19/006 |
| | | | | 345/633 |
| 2017/0287446 | A1 | 10/2017 | Young et al. | |
| 2018/0075653 | A1 * | 3/2018 | Schillings | G06F 3/041 |
| 2018/0113508 | A1 * | 4/2018 | Berkner-Cieslicki | H04N 5/33 |
| 2018/0308257 | A1 * | 10/2018 | Boyce | G06T 9/00 |
| 2019/0258058 | A1 * | 8/2019 | Fortin-Desch nes | |
| | | | | G02B 27/0093 |

FOREIGN PATENT DOCUMENTS

WO   WO 2018/156941 A1   8/2018

OTHER PUBLICATIONS

WO, PCT/US2018/058533 ISR and Written Opinion, dated Jan. 16, 2019.

* cited by examiner

*Primary Examiner* — David H Chu
(74) *Attorney, Agent, or Firm* — One LLP; Joseph K. Liu

(57) ABSTRACT

A virtual or augmented reality device is provided. The virtual or augmented reality device may include at least one visualization device and at least one computer that may be communicatively linked. The external computer may further include a central processing unit and a video adaptor. The video adaptor may supply multiple data stream to the visualization device. The virtual or augmented reality device may also include at least two displays that may be connected to the visualization device.

16 Claims, 43 Drawing Sheets

INTERACTIVE AUGMENTED OR VIRTUAL REALITY DEVICES

CROSS REFERENCE TO RELATED APPLICATIONS

This application claims priority to U.S. Provisional Patent Application No. 62/580,203, filed on Nov. 1, 2017 which is hereby incorporated in its entirety by reference and for all purposes.

TECHNICAL FIELD

The present invention generally relates to apparatus, methods, and systems configured to facilitate interactive augmented or virtual reality (AR/VR) environments for one or more users, and more specifically to interactive AR/VR environments that facilitate ultimate immersion and possess capability to enable users to work in AR/VR environments.

BACKGROUND

Due to the constantly evolving technological possibilities, people are now able to experience other realities than just the real world. There are many different technologies that offer these virtual realities. For example, a simple sound speaker can make people believe that they are somewhere else because of the sound they hear. A device that creates artificial smells or haptic feedback and/or an AR/VR headset can all provide similar experiences. Using several of these technological marvels together can further amplify the feeling that a user is in an AR/VR environment. When alternate realities mimic the actual reality, people may lose their perspective of the real world. This loss in perspective may lead to physical harm to the users, people around them, and/or their real surroundings.

AR/VR environments are accessible only through a variety of electronic devices, such as mobile phones, virtual reality headsets, augmented reality headsets, and mixed reality headsets (a headset that combines both AR/VR and actual reality). These electronic devices usually consist of a personal computer with powerful graphical processors that can drive visualization and deliver data, such as images, to embedded displays or data projectors. These devices are also known as Head Mounted Displays (HMDs), visualization devices, modules, and/or units in general. The devices display data that may describe, for example, various objects that a user may sense and/or with which a user may interact. Examples of these objects include objects that are rendered and displayed for a user to see, audio that is played for a user to hear, and tactile or haptic feedback for a user to feel. These devices are equipped with short-focus lenses to enable people to focus on the projected data from a short distance. They may also have different kinds of motion sensors commonly referred to as tracking sensors. These sensors mostly operate on different electromagnetic or light waves and measure rotation and/or position, thus capturing the movement of users or objects within an environment. By capturing the movement, they sensors provide an input signal of feedback loop. The input signal is transferred into the computer and processed by an application that provides the AR/VR environment data. Immersion is created by combining the data from the real world and the virtual environment image. There are many possible utilizations of HMDs ranging from computer games, visualization, and navigation to simulation, training, and industrial design.

Existing AR/VR devices use basic optical system that allow no or at the most one manual adjustment. Their lenses have static focus distance and thus the devices have limited adjustment capabilities and cannot work for most of the population. This issue especially affects industries, such as the entertainment industry, where users need to setup AR/VR devices quickly to be able to enjoy the experience in a given timeframe.

To accurately use the AR/VR visualization to mimic real world simulations, position and orientation tracking of various objects is important. Further, in AR/VR, precise and fast tracking is important for a deep sense of immersion. There are many ways to accomplish responsive and accurate tracking. The most common ones are: a) "Optical," where accurate position and orientation tracking is accomplished using multiple cameras and image processing. It is more expensive than others, requires high computing power, and tends to be slower. It also requires a direct line of sight from the tracked object to multiple cameras. b) "Received signal strength indication (RSSI)," which is a semi-accurate position tracking system that receives signal strength indication of radio signals. Its orientation tracking is problematic due to low accuracy and it is susceptible to reflections and interference. c) "Time of flight" is a more accurate position tracking than RSSI and uses radio signal. It is resilient to reflections but can be obscured by metallic objects. d) "Inertial measurements (IMU)" does not need any external sensors. Its orientation tracking is fast and reasonably precise. However, it tends to accumulate error over time due to its integration nature. The position tracking is not practically usable with common sensors. e) "Global Positional Systems (GPS)" is a semi-accurate measurement of position. But it is slow and requires outdoor use.

The most common sensor for orientation measurement is "Micro-Electro-Mechanical Systems (MEMS)" technology, which is used in mobile phones, cars, and AR/VR devices. Although these sensors have improved greatly during past years they are still not as reliable as one would desire. Orientation is typically estimated using multiple types of sensors. For example, rate gyroscopes measure actual angular velocity. They are precise for short time measurements. But to get orientation measurements one has to integrate the angular velocity. Integration error accumulates during longer runs and these measurements get more and more imprecise. Accelerometers measure current gravity vector. They provide precise and stable measurement of tilt in horizontal plane. But they tend to be susceptible to vibrations, shocks, and other short time disturbances. By combining measurements from gyroscopes and accelerometers one can achieve good short-time precision and responsiveness with long-time stability. Unfortunately, accelerometers are blind to rotation around vertical axis and cannot compensate the gyroscope for that. Traditionally, this could be solved by incorporating a magnetometer into the mix. In common habitable areas on Earth, magnetometer can be used to determine the absolute rotation around vertical axis. But magnetometers are very susceptible to the disturbances in magnetic flux. The typical indoor virtual reality environment is filled with metallic object and electric currents making magnetometer measurements very unreliable.

Further, the most advanced AR/VR devices use eye tracking technology to determine the wearer's focus so as to improve data quality in such region and lower the data quality in the surrounding areas to save computing performance. With sufficient precision such eye tracking systems can be used to control AR/VR environments and to obtain valuable information about the wearer's interests. However, eye tracking is hard to accomplish because the mechanism requires complex constructions, which limits the whole device.

AR/VR is being adapted for a variety of different uses, most commonly within computer games. Yet, there are many more beneficial uses, for example virtual traveling, remote training, and product design. Even within the software industry, growing awareness of the possible AR/VR utilizations has led to applications that are usable in AR/VR environments. However, for most of the professional uses, for example technician training, assembly line quality check, simulators training, materials design, products inspections, training of surgeons, relaxation scenarios, military training, psychical diseases and phobias treatment, marketing research, current AR/VR devices do not suffice. In many of these cases, it is crucial for AR/VR models or environments to be as close to the real product or environment as possible. Only then can the AR/VR environment be a beneficial basis for good decision making and serve as a reference before any real product or environment is built. Consequently, devices that facilitate ultimate immersion and possess capability to enable people to work in AR/VR are needed.

There are many limitations in the existing VR headsets, such as a limited field-of-view, which causes a tunnel vision and visual artifacts, such as image distortion and chromatic aberration (rainbow effect). The most common setup of VR headsets uses one or two displays and two lenses positioned in parallel with the displays. Another common VR headset setup uses two displays positioned at a certain angle ranging from 5 to 20 degrees. Even the most advanced VR headsets that claim a field-of-view of 200+ degrees are not sufficient to cover a human's complete field-of-view. Therefore, when a user wearing the currently available VR headsets looks to the side, the edges of the image appear black, i.e., there is a serious lack of immersion in the currently available VR headsets. Thus, there is a need for VR headsets that have a better immersion and do not have any visible black edges.

Most of the existing VR headsets also use round lenses that are not able to utilize the full resolution of the displays, which limits immersion even more and downgrades effective resolution of the VR experience. These VR headsets also suffer from image distortion due to lens magnification and chromatic aberration. Image distortion and chromatic aberration are most visible on the edges of the lenses. While both image distortion and chromatic aberration can be compensated by software algorithms, such a compensation is limited as it depends on computing the exact position of a user's eye with respect to the position of the lens.

Existing virtual reality devices with additional front-facing cameras can be used to project digital data, such as images, from the real environment in real-time, thus supplementing virtual reality devices with augmented reality functions. However, such an experience is unpleasant due to low resolution of front cameras and their lack of capacity to adjust to users' head shape and distance between the eyes.

Therefore, new solutions that provide a much more realistic AR/VR experience are needed. Also, these AR/VR devices should be automatically adjustable to a user's head shape and eye distance to provide comfort and deliver higher precision and quality. Further, these AR/VR devices need to simplify the already existing complex construction of eye tracking visualization devices.

SUMMARY

Embodiments of the invention comprise a wearable AR/VR device that facilities ultimate immersion and possesses capability to enable people to work in AR/VR. In some embodiments, the AR/VR device combines a new technological approach of optics and electronics to create automatically adjustable and precise lenses. In some embodiments, the AR/VR device may include multiple setups of optics together with the automatic lens adjustment process. In some embodiments, the AR/VR device may utilize separate state of the art technologies to create the best immersion and visual quality of the AR/VR experience. These technologies may be freely combined to service a wide range of audience and uses. The technology described below may be used in combination or separately within the AR/VR devices.

Embodiments of the present invention details various AR/VR devices. In some embodiments, the AR/VR device may include at least one visualization device and at least one computer that may be communicatively linked. The external computer may further include a central processing unit and a video adaptor. The video adaptor may supply multiple data stream to the visualization device. The virtual or augmented reality device may also include at least two displays that may be connected to the visualization device.

In some embodiments, an AR/VR device may include one multiplexed input video signal, a video signal splitter, and at least one display located within the AR/VR device. The displays may be identifiable by a personal computing device. In some embodiments, there may be multiple displays within the AR/VR device. In some embodiments, these displays may be identified by the computing device as one large display combining all the physically available data across the various displays. In other embodiments, the multiple displays may be identified by the computing device as several separate displays. In some embodiments, the AR/VR device may include one video signal channel, video signal splitter, and separate displays. In some embodiments, using a single video signal channel and video signal splitter may allow easy installation of the AR/VR device and exploiting its capabilities to the widest extent possible. In some embodiments, the displays may be flexible and may also have lenses that substantially mimic the curvature of the displays. In some embodiments, the AR/VR device may be communicatively linked to a VR video transformation box as described herein.

In some embodiments, the AR/VR device may facilitate a general transfer of information between real and AR/VR environments. In some embodiments, a VR device may include an advanced and/or a simulated module for augmented/extended reality (XR), which may enable the VR device to provide an AR/XR experience.

This summary and the following detailed description are merely exemplary, illustrative, and explanatory, and are not intended to limit, but to provide further explanation of the invention as claimed. Other systems, methods, features, and advantages of the example embodiments will be or will become apparent to one skilled in the art upon examination of the following figures and detailed description.

BRIEF DESCRIPTION OF THE FIGURES

The figures provided are diagrammatic and not drawn to scale. Variations from the embodiments pictured are contemplated. Accordingly, illustrations in the figures are not intended to limit the scope of the invention.

DETAILED DESCRIPTION

Figure 1:
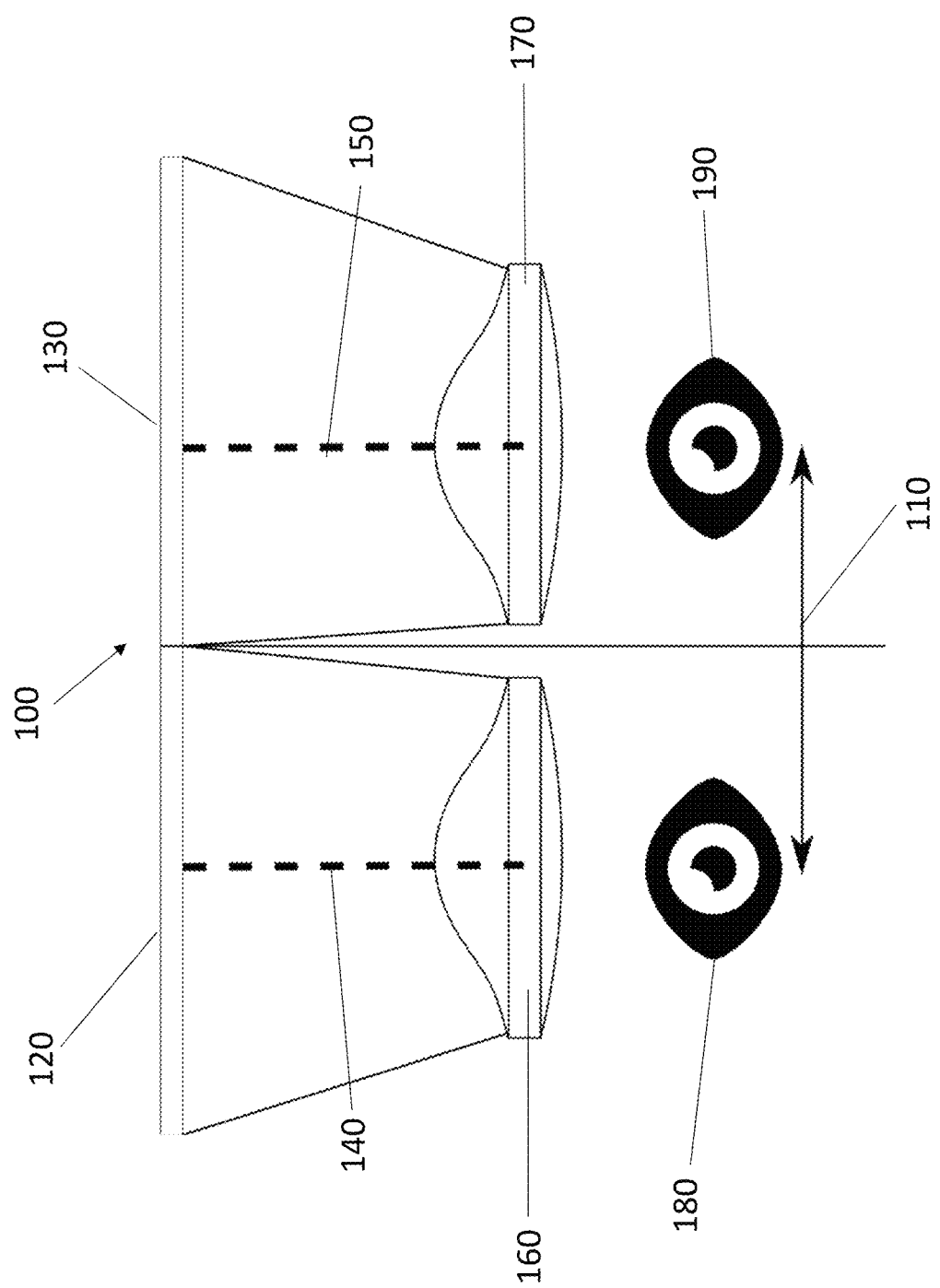
FIG. 1 illustrates an existing optical system for AR/VR.

The following disclosure describes various embodiments of the present invention and method of use in at least one of its preferred, best mode embodiments, which is further defined in detail in the following description. Those having ordinary skill in the art may be able to make alterations and modifications to what is described herein without departing from its spirit and scope. While this invention is susceptible to different embodiments in different forms, there is shown in the drawings and will herein be described in detail a preferred embodiment of the invention with the understanding that the present disclosure is to be considered as an exemplification of the principles of the invention and is not intended to limit the broad aspect of the invention to the embodiment illustrated. All features, elements, components, functions, and steps described with respect to any embodiment provided herein are intended to be freely combinable and substitutable with those from any other embodiment unless otherwise stated. Therefore, it should be understood that what is illustrated is set forth only for the purposes of example and should not be taken as a limitation on the scope of the present invention.

In the following description and in the figures, like elements are identified with like reference numerals. The use of "e.g.," "etc.," and "or" indicates non-exclusive alternatives without limitation, unless otherwise noted. The use of "including" or "includes" means "including, but not limited to," or "includes, but not limited to," unless otherwise noted.

FIG. 1 illustrates an AR/VR optical system 100. The AR/VR optical system 100 consists of lenses 160, 170, which allows a user's eyes 180, 190 to see focused data that is be projected to a left display 120 and a right display 130. Focus distance 140, 150 between the left and right displays 120, 130 is static. Because humans have different distance between nose and eyes adjustable pupillary distance 110 is needed.

Figure 2:
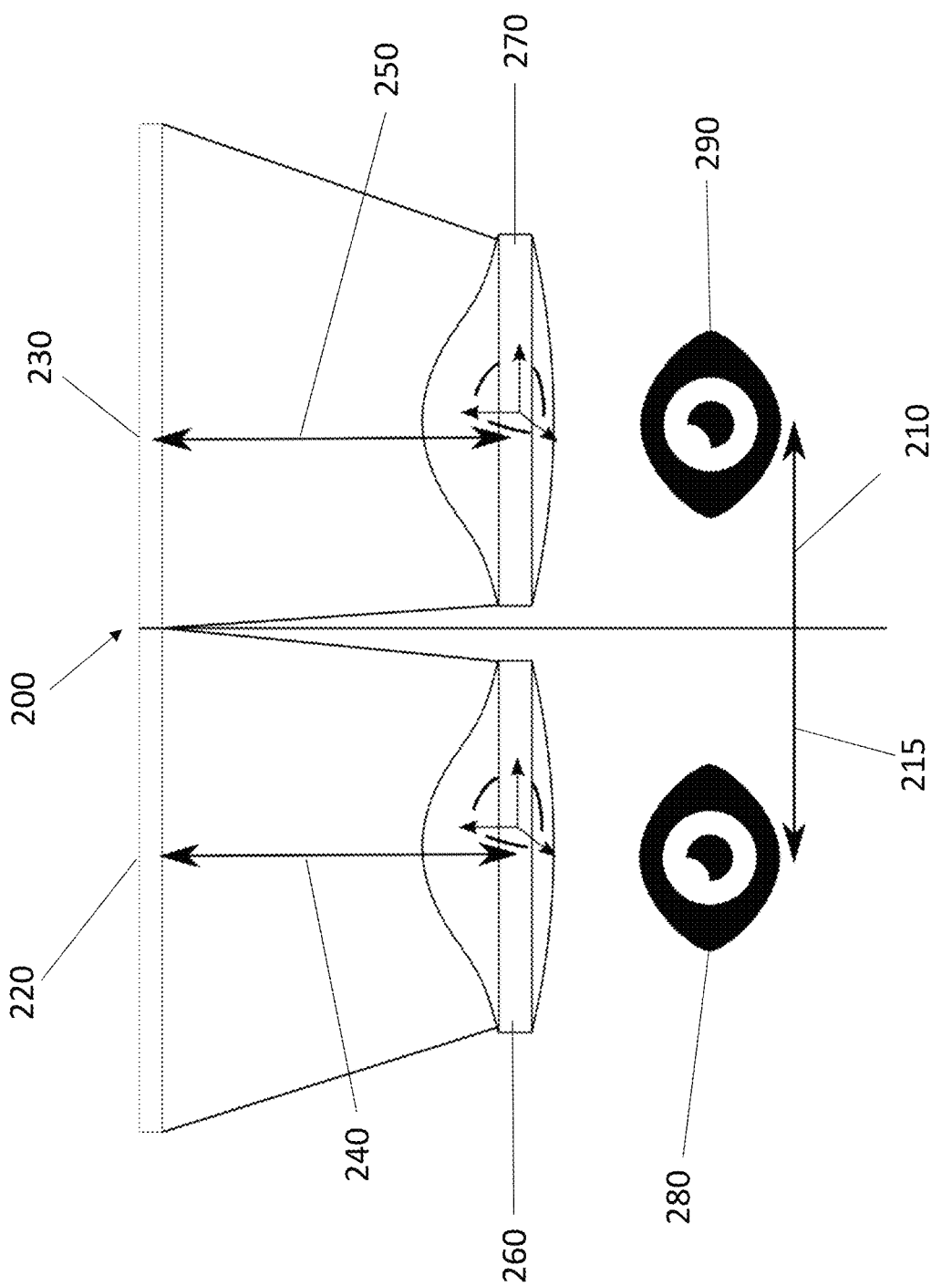
FIG. 2 illustrates an adjustable optical system for AR/VR, according to exemplary embodiments of the present invention.

FIG. 2 illustrates an adjustable AR/VR optical system 200 that may use similar or different lenses 260, 270, and displays 220, 230. The distance between them may be variable and may be adjusted by moving the left lens 260, right lens 270, left display 220, and/or right display 230. Left lens 260 and right lens 270 may be rotated separately to adjust to a user's view. Left pupillary distance 215 and right pupillary distance 210 may be adjusted separately. The left focus 240 and right focus 250 may be adjusted separately as well.

Figure 3:
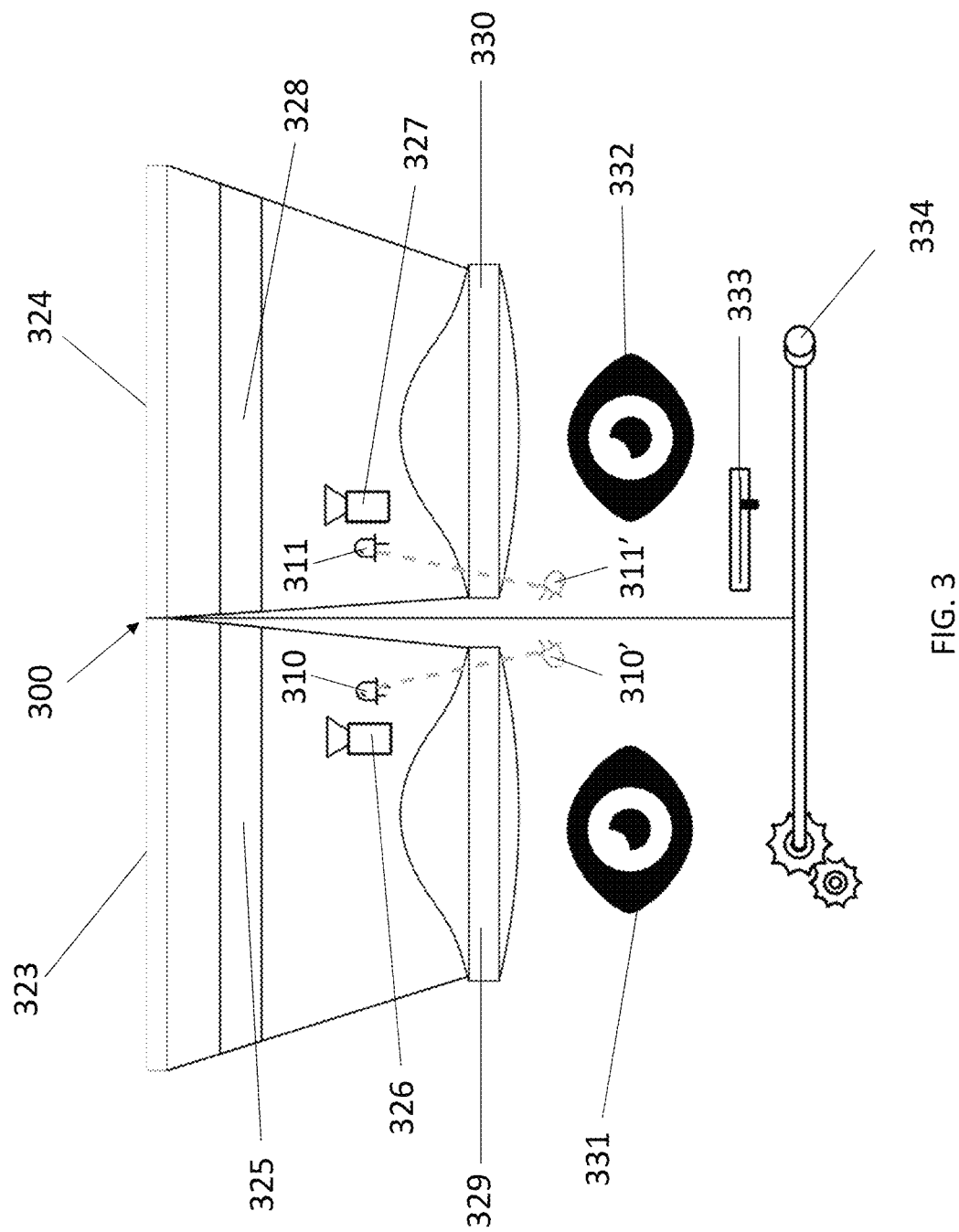
FIG. 3 illustrates an existing eye-tracking system for AR/VR using semi-permeable mirror.

FIG. 3 illustrates a standard AR/VR system with eye tracking 300 that uses infrared cameras 326, 327 with additional LEDs 310, 311 that may be positioned between the displays 323, 324 and lenses 329, 330 or directly near a user's eyes as shown by LEDs 310', 311' for eye tracking. Each eye 331, 332 has a separate eye tracking camera, namely left eye tracking camera 326 and right eye tracking camera 327. Cameras 326, 327 see into the user's eyes 332, 332 because of reflections provided by the left semi-permeable mirror 325 and right semi-permeable mirror 328. These mirrors 325, 328 are positioned and rotated to allow cameras to see user's eyes 331, 332 and avoid reflection of image from displays 323, 324. The mirrors 325, 328 can reflect the wavelength that the cameras 326, 327 can see but the human eye cannot. Adjustability of pupillary distance is mostly provided by the manually-adjustable pupillary distance mechanism 334, which is connected to pupillary distance measurement sensor 333 that provides feedback of lenses 329, 330 positions.

Figure 4:
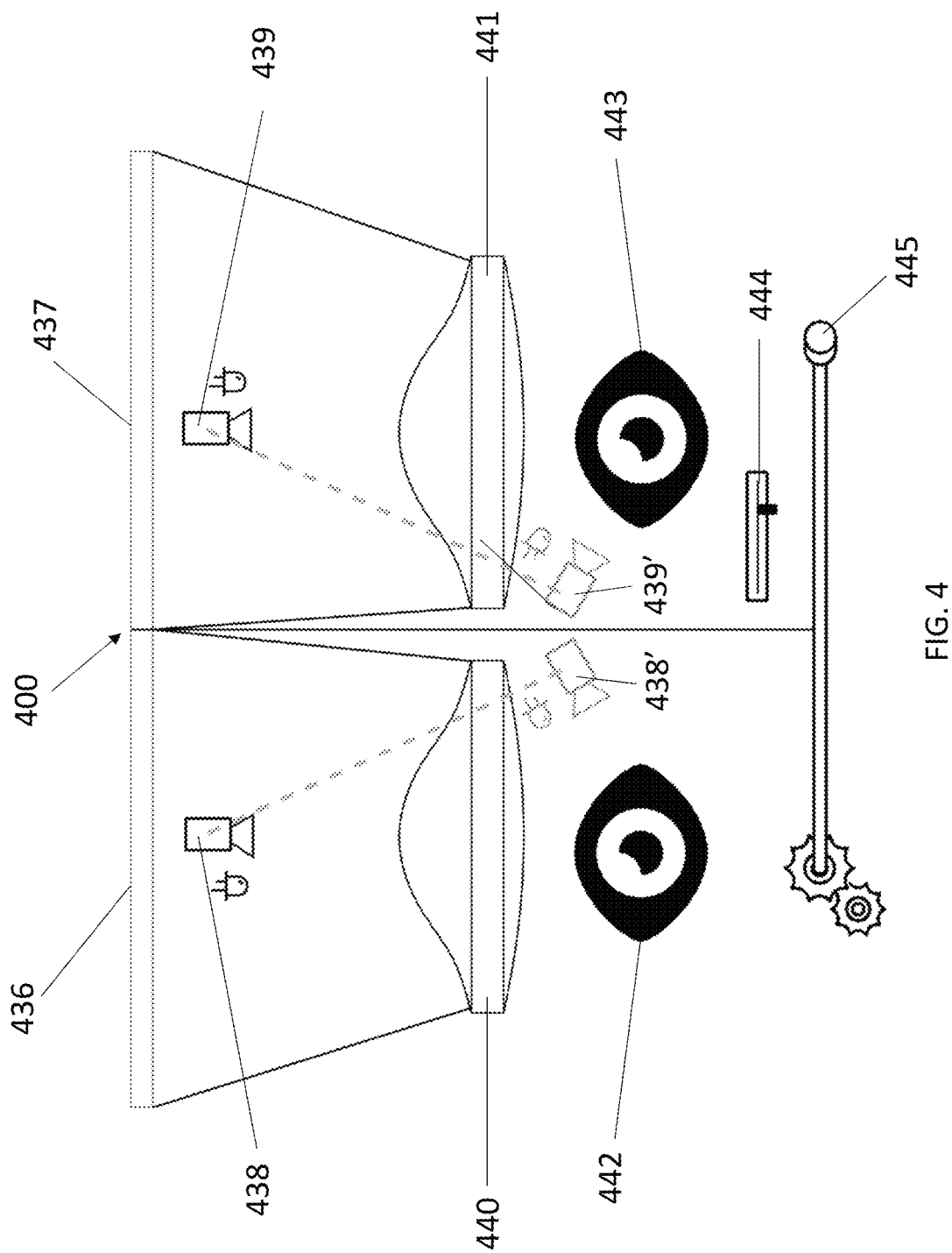
FIG. 4 illustrates an existing direct eye-tracking system for AR/VR.

FIG. 4 illustrates an AR/VR system with direct eye tracking 400 that may use a left eye tracking camera 438 with or without LEDs and a right eye tracking camera 439 with or without LEDs. Left lens 440, right lens 441, left display 436, and right display 437 may be similar to the ones described in other figures. The cameras 438, 439 may look directly into a user's eyes 440, 441 and may not have any additional semi-reflective mirrors. Cameras 438, 439 may be placed between the lenses 440, 441 and eyes 442, 443 or at different locations, such as the one shown by cameras 438' and 439'. Cameras 438, 439, 438', and/or 439' may work on any spectrum. Adjustability of pupillary distance may be again done by the manually adjustable pupillary distance mechanism 445, which may be connected to pupillary distance measurement sensor 444 providing feedback of lenses 440, 441 positions. Some examples of available eye tracking devices include: SMI eye tracking system; FOVE that employs semi-permeable mirror; TOBII; and Pimax.

Figure 5:
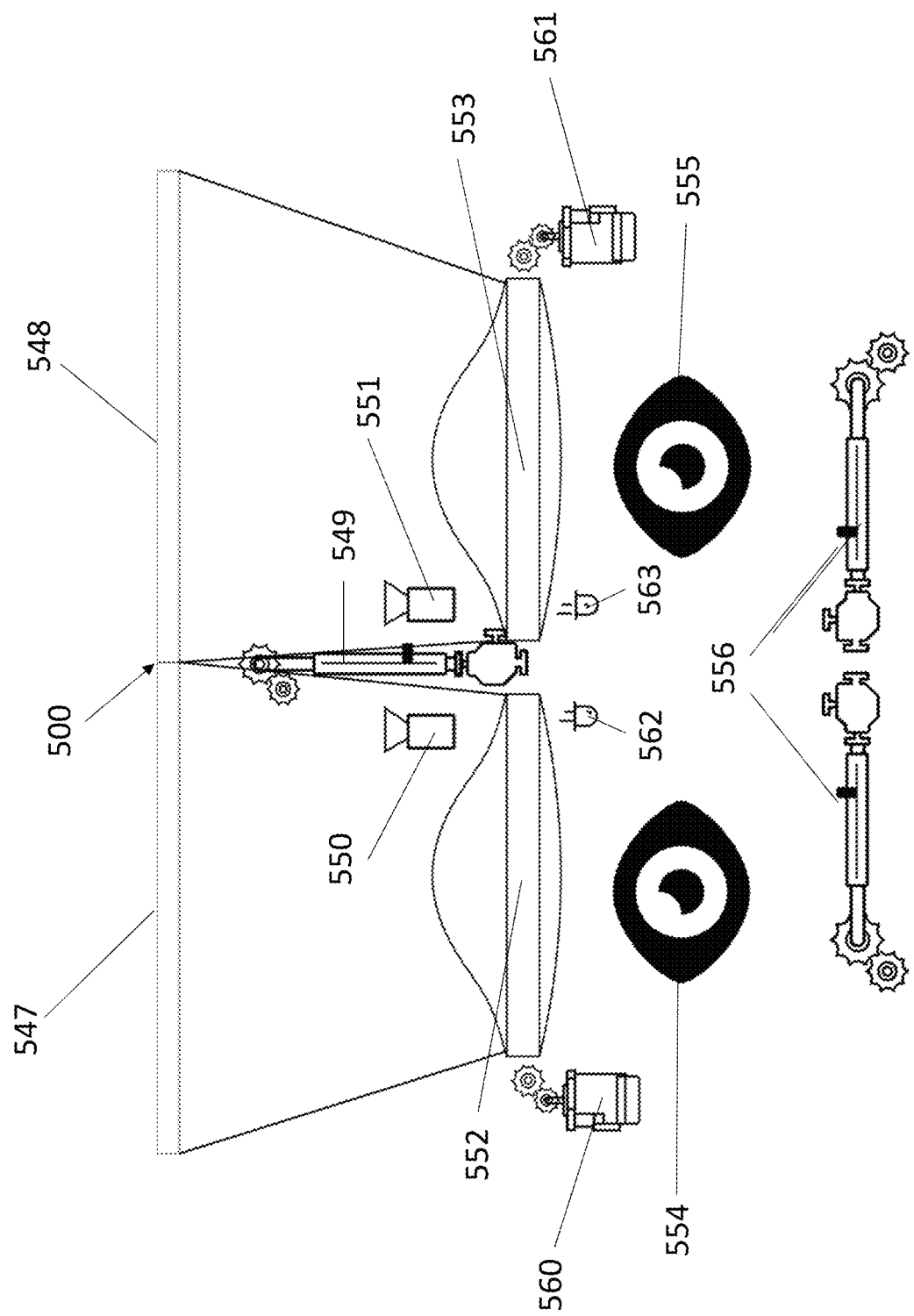
FIG. 5 illustrates an advanced eye-tracking system for AR/VR, according to exemplary embodiments of the present invention.

FIG. 5 illustrates an advanced AR/VR eye tracking system 500 that combines automatically adjustable focus 549 automatically adjustable left and right lens 552, 553 by left and right actuators 560, 561 and automatically adjustable pupillary distance mechanism 556 for each eye, consisting of two additional actuators. These automatically adjustable mechanisms 549, 552, 553, 560, 561, 556 may use electrical actuators such as servomotors with sensors to provide feedback of actual position of the actuators. In some embodiments, the tracking cameras 550, 551 measure the position of the user's eyes 554, 555. The position information may then be provided to a computing device, such as a computer, which calculates distance of each eye 554, 555 from the nose of every user. This measurement information is then shown to the user to adjust the AR/VR headset or provided to the actuators 560, 561, such as servo motors, which adjust the position of the lenses 552, 553 automatically. Other sensors may also be supplemented. Left eye tracking camera 550 and right eye tracking camera 551 use reflection of left and right display 547, 548 allowing cameras to see into a user's eyes 554, 555 without the need for any additional components. Displays 547, 548 work as a mirror for cameras and may be coated in semi-permeable infrared reflecting layer to enhance reflection. Other forms of coating that facilitate similar results may also be used. LEDs 562, 563 may be used for additional lighting.

Figure 6:
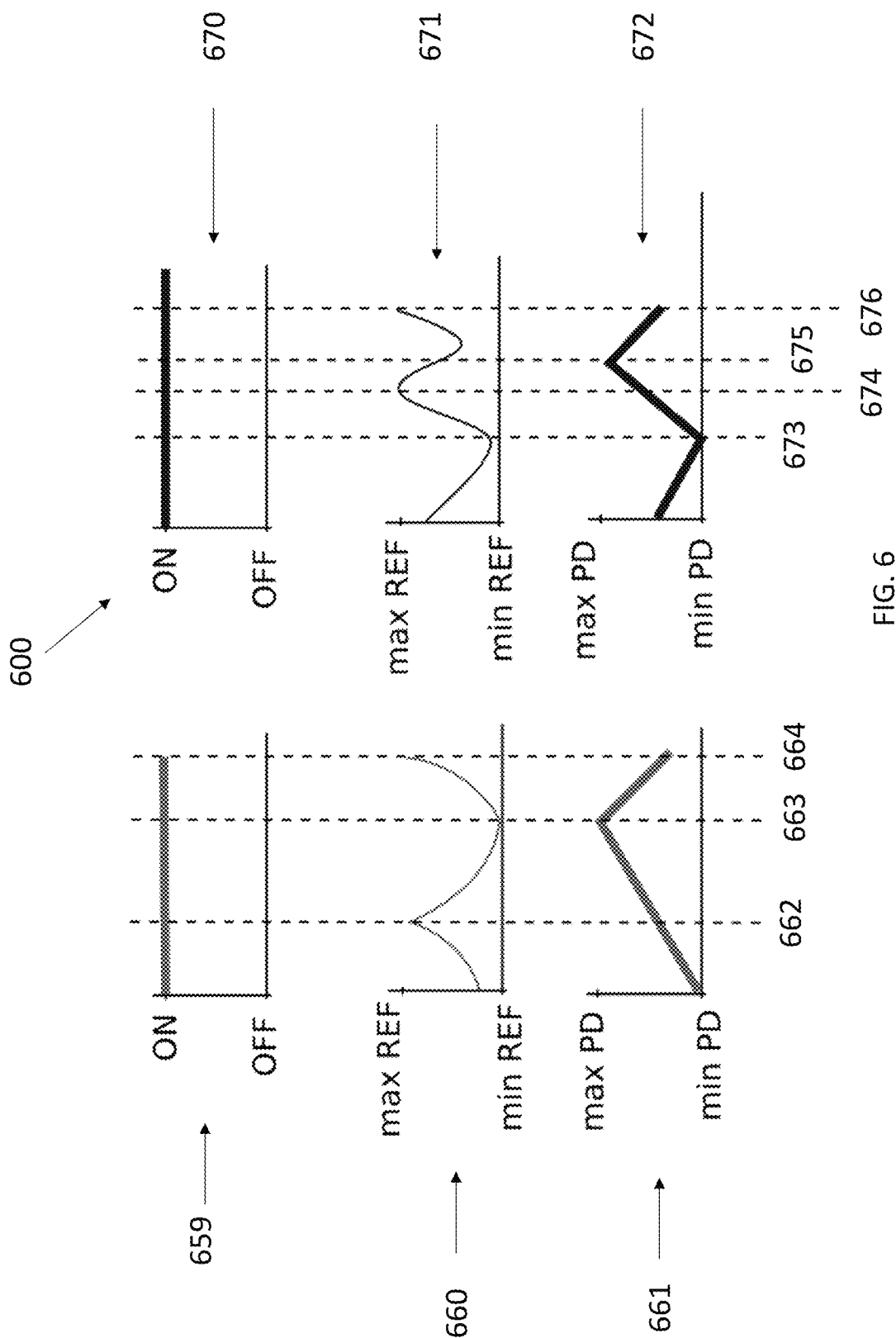
FIG. 6 illustrates digital signals when a setup mode of advanced eye-tracking system for AR/VR runs, according to exemplary embodiments of the present invention.

FIG. 6 illustrates a setup mode time graphs 600 during the measurement and calibration of correct lens position. Both the left eye tracking camera 659 and the right eye tracking camera are on 670 during the whole process. The video captured from both the cameras may be sent to a processing unit, where an algorithm may detect the probability of correct lens position based on light reflection from a user's eye ball. The algorithm may get a digital image of the user's eye as an input. Then image recognition to find an oval shape may be applied. This recognition may be based on the approximation of the biggest oval shape positioned around the most reflecting part of the image. When the oval shape is detected, the center of the user's eyeball is estimated to be in the center of the oval shape. This measurement may repeat multiple times and a filter or simple average may be applied to approximate the most accurate position of the user's eyeball. After the center is defined, the processor may move the lenses to the ideal position using actuators, such as servomotors. Ideal position may be defined by generally available optical systems or any other known methods. Graph 660 illustrates the algorithm recognition outcome from a left eye and graph 671 illustrates the algorithm recognition outcome from a right eye of the user. "Max REF" value illustrates the detected ideal position of the lens. Graph 661 illustrates the movement of a left lens actuator and graph 672 illustrates the movement of a right lens actuator. The left lens actuator starts in a minimal position and at a time 662 the algorithm detects the maximum position. However, the left lens actuator continues the measurement till it reaches time 663 and the maximum position. With the whole scale measured, the processing unit sends a command to the actuator to reach the previously detected ideal position. The actuator reaches ideal position at time 664 thus measuring the exact pupillary distance (PD) for the left eye. A similar process happens with the right lens and its actuator as well. The actuator starts in the middle position and moves to the minimal position that is reached at time 673. Then it starts moving to the maximum position. At time 674, the actuator reaches this position where a processing unit detects its position with maximum reflection, but it keeps moving into the maximum position, which is reached at time 675. Then the processing unit sends a command to the actuator to reach the previously detected ideal position. The actuator reaches its ideal position at time 676 thus measuring the exact PD for the right eye.

Figure 7:
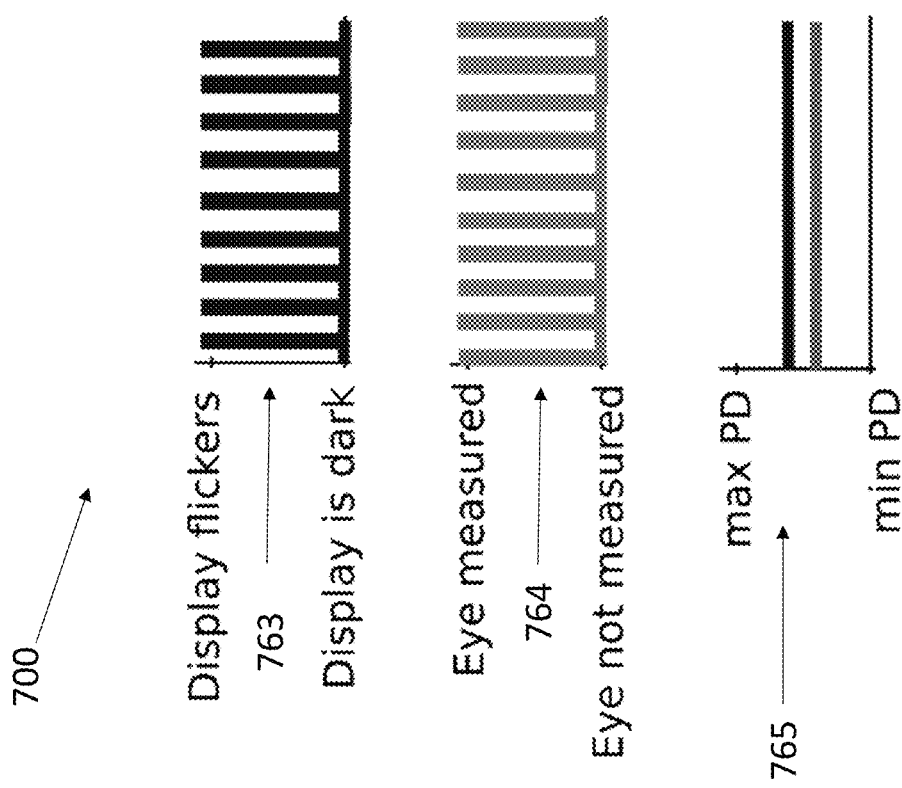
FIG. 7 illustrates digital signals when an operational mode of advanced eye-tracking system for AR/VR runs, according to exemplary embodiments of the present invention.

FIG. 7 illustrates an operational mode time graph 700 using low persistence displays, where eye position is measured between display flickering. During the process, as illustrated by graph 765, the position of the lens actuators is stable (not changing). Graph 763 illustrates that low persistence display flickers allowing a user to see a picture. In between these flickers, as illustrated by graph 764, the user's eyes are measured using at least one camera and at least one processing unit with eye detection algorithm. The algorithm may be similar to that described above. To achieve better visibility of the user's eyeballs the LEDs may flicker when the eyes are being measured.

Figure 8:
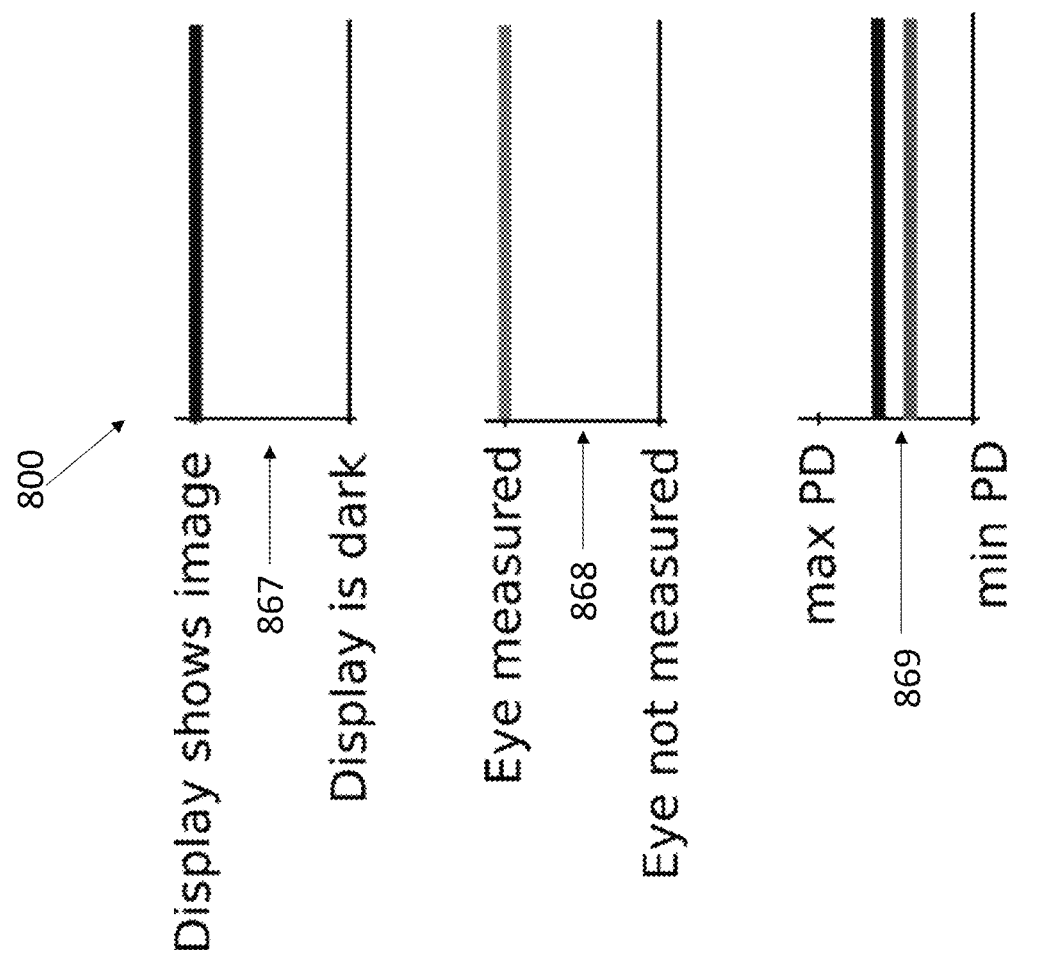
FIG. 8 illustrates digital signals when an extensive mode of advanced eye-tracking system for AR/VR runs, according to exemplary embodiments of the present invention.

FIG. 8 illustrates an extensive mode time graph 800 using full persistence displays where the eye position is being measured continuously. During the process, as illustrated by graph 869, the position of lens actuators is stable. Full persistence display continuously shines showing an image to a user, as illustrated in graph 867. The eyes may be measured continuously, as illustrated in graph 868 and at least one processing unit with an eye detection algorithm may continuously recount the detected position of the eyeball. To achieve better visibility of the user's eyeballs, LEDs may be turned on.

Therefore, as illustrated, in some embodiments, the advanced AR/VR eye tracking may operate in three different modes, namely, the setup mode (FIG. 6), operational mode (FIG. 7), and extensive mode (FIG. 8). FIGS. 6, 7, and 8 illustrate three most important signals. The graphs illustrate how an eye tracking system may work with both type of displays: low persistence and full persistence. FIG. 6 illustrates the measurement and adjustment process of the lenses positioning with the aim to find an ideal position and to ensure precise PD for a user.

Figure 9:
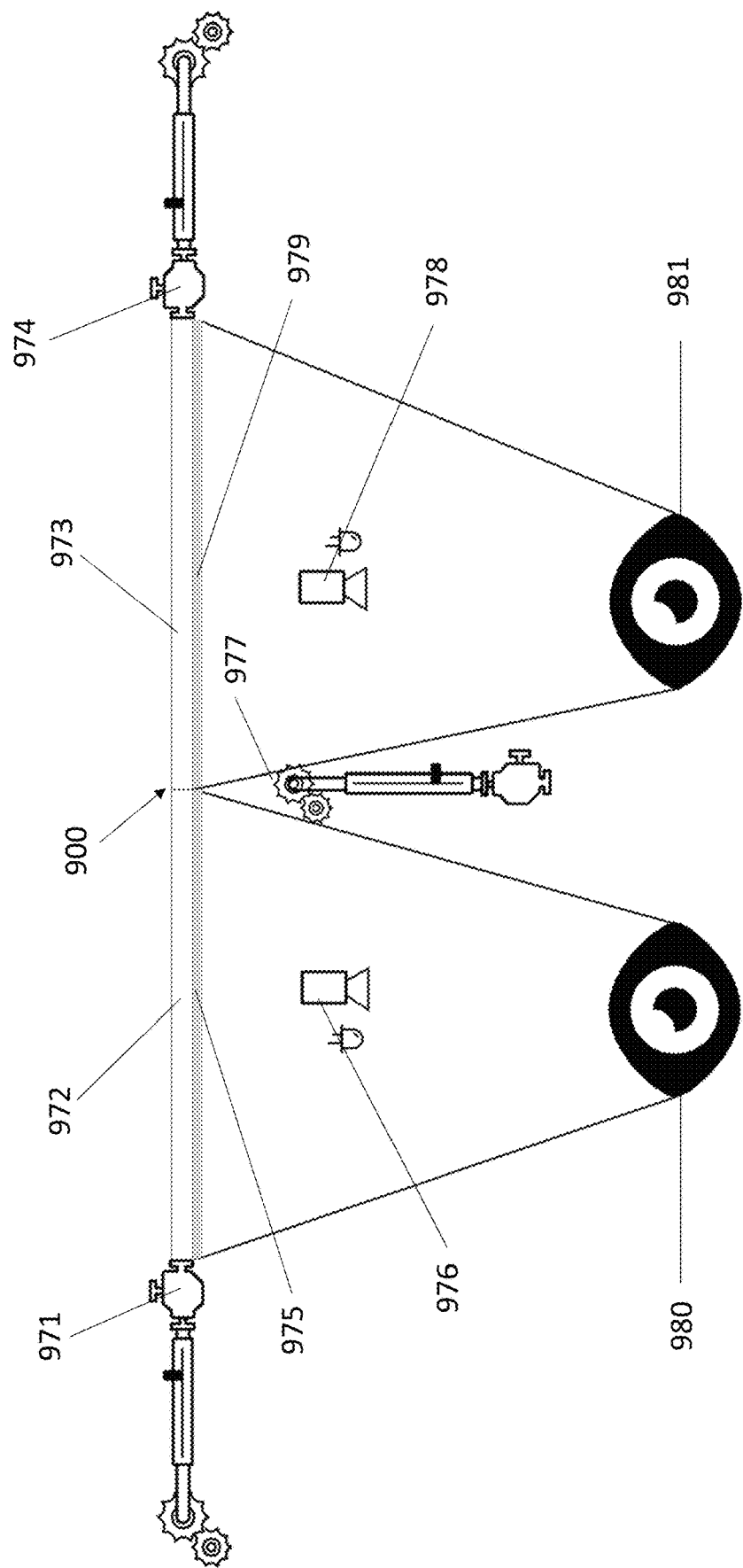
FIG. 9 illustrates a self-compensating advanced eye-tracking system for AR/VR, according to exemplary embodiments of the present invention.

FIG. 9 illustrates a self-compensating advanced AR/VR system with eye tracking 900. The system 900 may use ultra-thin compensation layer 975 for left eye 980 and ultra-thin compensation layer 979 for right eye 981. These layers may be closely attached to both displays 972, 973. The ultra-thin compensation layers 975, 979 allows users to see focused data, such as an image, on left display 972 and right display 973 from a very close distance. This is possible since the light beam aims all the data, such as every pixel of an image, precisely at the eyes 980, 981 to its focus center. Adjustment of distance between eyes 980, 981 is handled automatically by the left eye tracking system 976 and right eye tracking system 978, which track the eyeballs and provide information about the center of pupils to automatic adjustments actuators 971, 974. These systems may consist of at least one camera and LEDs and may be positioned as described in the previous figures. In some embodiments, the self-compensating AR/VR eye tracking system 900 may also include an automatically adjustable focus 977. The automatically adjustable focus 977 may work using servomotors as described in the figures above or using any other technique.

Figure 10:
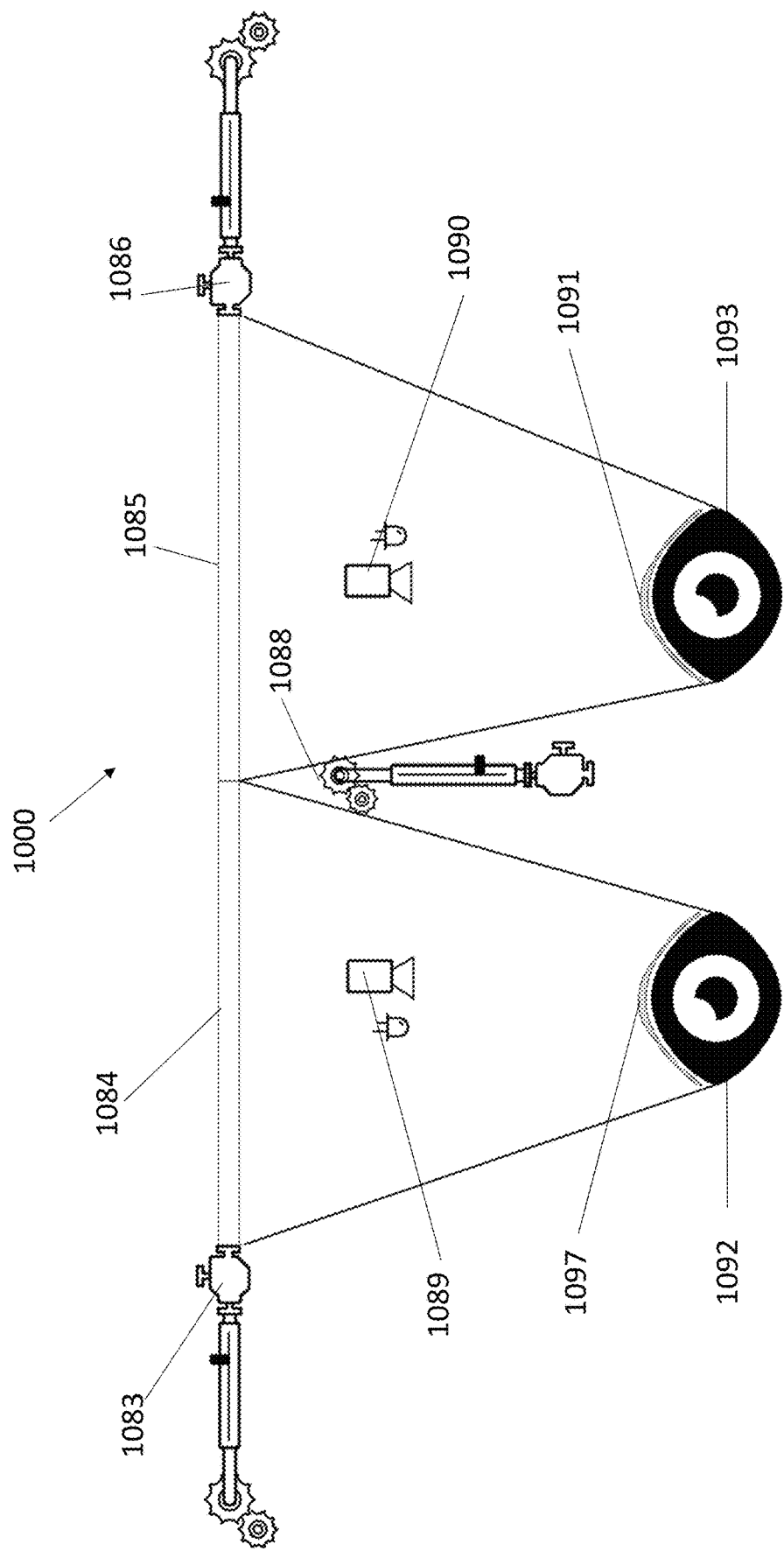
FIG. 10 illustrates a contact-lenses based advanced eye-tracking system for AR/VR, according to exemplary embodiments of the present invention.

FIG. 10 illustrates a contact lenses based advanced VR/AR system with eye tracking 1000. The contact-lens based system 1000 may include a left contact lens 1097 and a right contact lens 1091 that may allow a user to focus on close objects and/or a left display 1084 and a right display 1085. The contact-lens based system 1000 may prevent distortion on the sides of a user's field-of-view because the lenses 1097, 1091 move and rotate with the user's eyes 1092, 1093. Adjustment of distance between displays 1084, 1085 is handled automatically by a left eye tracking system 1089 and a right eye tracking system 1090, which track the eyeballs and provide more information about the center of pupils to automatic adjustments actuators 1083, 1086. These systems may consist of at least one camera and LEDs and may be positioned as described in the previous figures. In some embodiments, the system 1000 may also include automatically adjustable focus 1088.

Figure 11:
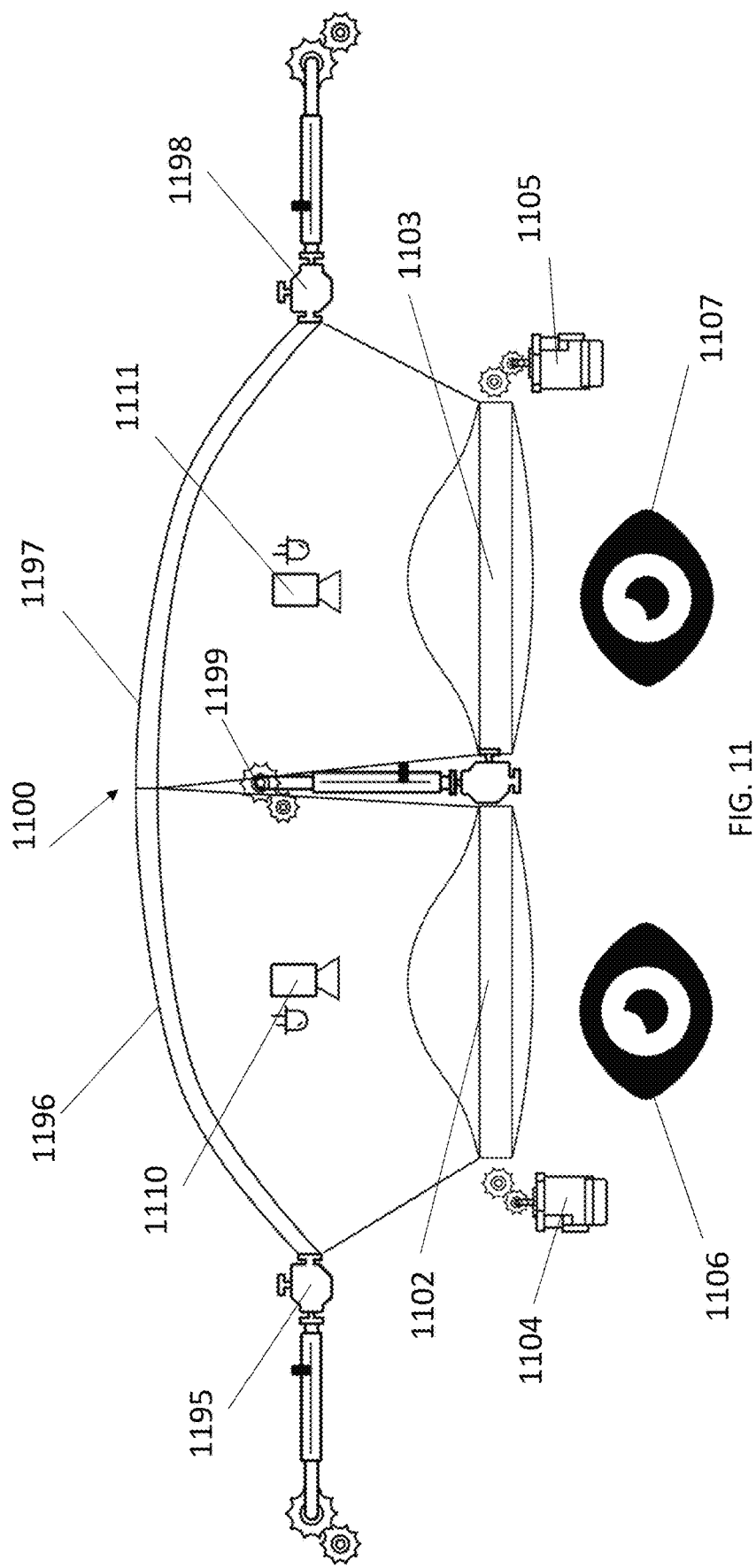
FIG. 11 illustrates a flexible eye-tracking system for AR/VR, according to exemplary embodiments of the present invention.

FIG. 11 illustrates an AR/VR system with flexible displays and eye tracking 1100. Left flexible display 1196 and right flexible display 1197 may effectively compensate the distortion, which is possible by using standard flat displays, caused by different distance between lenses 1102, 1103 and displays 1196, 1197. When you have normal flat displays, the problem is that the distance between the corner of the displays and the lens is different than the distance between center of the displays and the lens. This difference causes additional distortion and needs to be compensated. With flex screens, this difference can be compensated and same distances between the lens and every position of display can be achieved, which is helpful. Adjustment of distance between displays 1196, 1197 and position of the lenses 1102, 1103 is provided by the left eye tracking system 1110 and the right eye tracking system, which track the eyeballs and provide information about the center of pupils to automatic adjustments actuators 1195, 1198, 1104, 1105. These systems may consist of at least one camera and LEDs that may be positioned as described on previous figures. In some embodiments, the system 1100 may also include automatically adjustable focus 1199.

Figure 12:
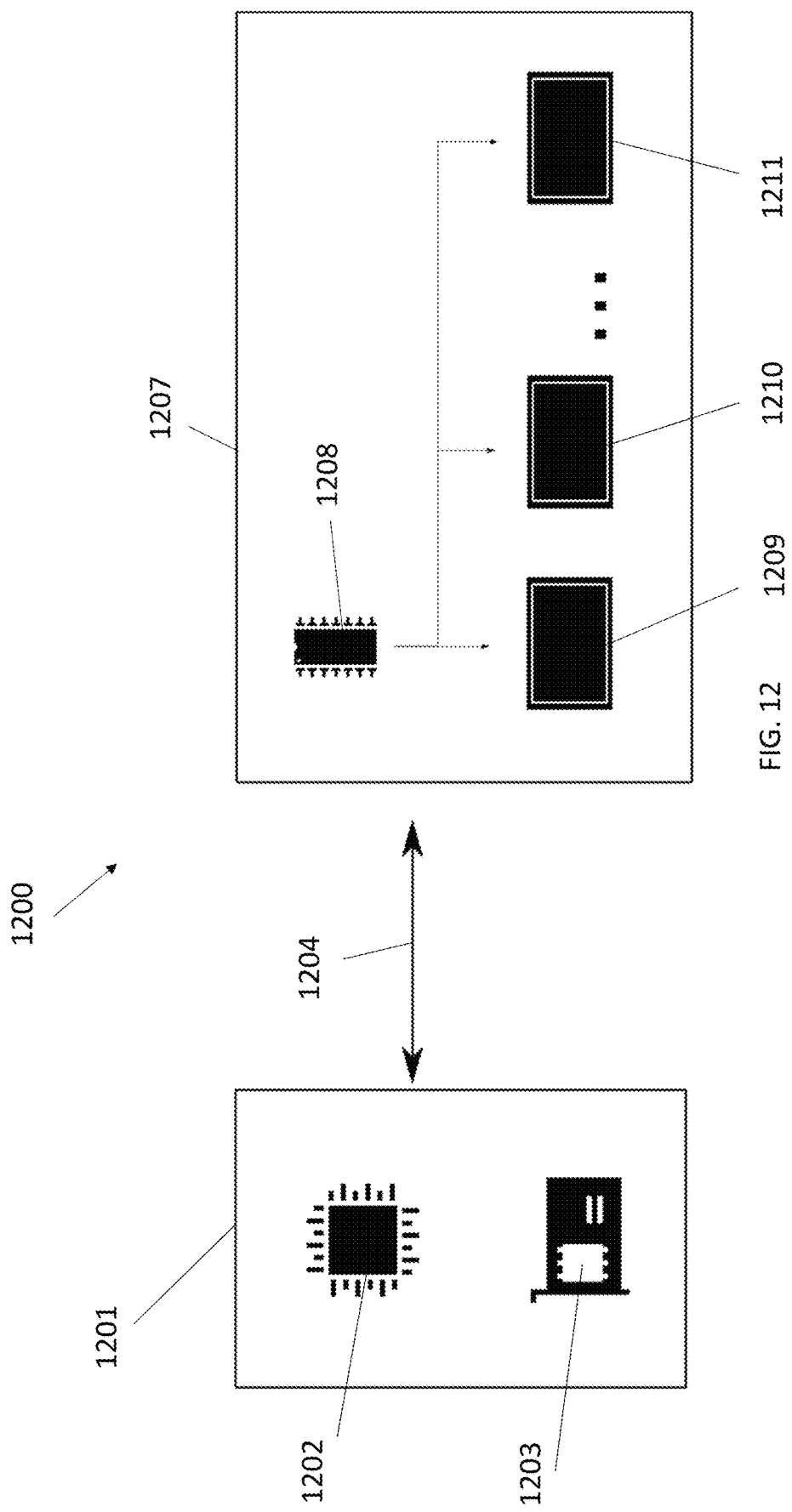
FIG. 12 illustrates an existing AR/VR device with a high-level block visualization running via external computer.

FIG. 12 illustrates an existing VR/AR device with a high-level block visualization 1200 running via an external computer 1201 communicatively linked to a visualization AR/VR device 1207. The computer 1201 includes a central processing unit 1202 and a video-adapter 1203 that supplies a single video stream signal that supplies audio and other data 1204. The visualization device 1207 includes at least one video chip 1208, which sends signals to at most three displays 1209, 1210, 1211. The video chip 1208 has the potential to supply the signal to a finite amount of displays 1209, 1210, 1211.

Figure 13:
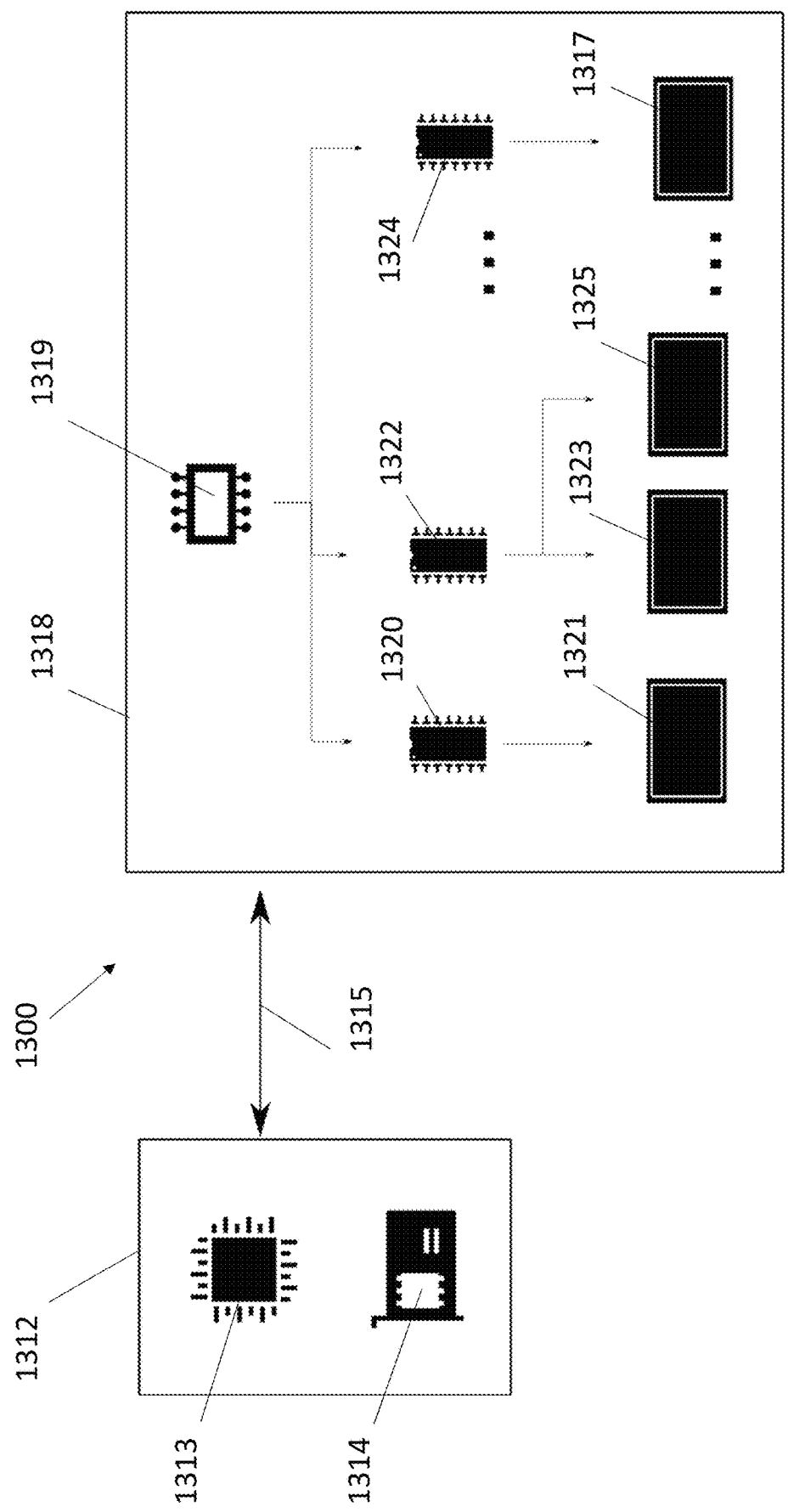
FIG. 13 illustrates a multiple video stream AR/VR device with a high-level block visualization running via external computer, according to exemplary embodiments of the present invention.

FIG. 13 illustrates a multiple video stream AR/VR device with a high-level block visualization 1300 running via an external computer 1312 communicatively linked to a visualization device 1318. The computer 1312 includes a central processing unit 1313 and a video-adapter 1314. The computer's 1312 video-adapter 1314 supplies a multiple video stream 1315 in the form of any wired or wireless stream feeding the video signal into the visualization device 1318. The visualization device 1318 includes at least one dedicated video splitter/demultiplexer 1319, which splits the signal into more branches using one or more video chips 1320, 1322, 1324 and each of them is connected to one or more displays 1321, 1323, 1325, 1317.

All commercially available and disclosed experimental visualization devices utilize either: (i) one video signal channel and one display; (ii) multiple video signal channels and multiple displays; or (iii) one video signal channel, a common bridge converter, and multiple displays. In the last case, converter's output signal initially intended for just one display is fed into the separate displays. No known visualization device uses one multiplexed video signal channel, a dedicated video signal splitter and separate bridge converters and displays. Some examples of available visualization devices include: Oculus Rift, which has one video signal channel (cable), no splitter, and two displays; HTC Vive, which has one video signal channel (cable), no splitter, and two displays; Idealsee, which has two video signal channels (cables), no splitter, and two displays; StarVR, which has two video signal channels (cables), no splitter, and two displays; and Samsung Gear VR, which has one video signal channel (wireless), no splitter, and one display; and Sony Morpheus VR, which has one video signal channel (cable), no splitter, and one display.

Figure 14:
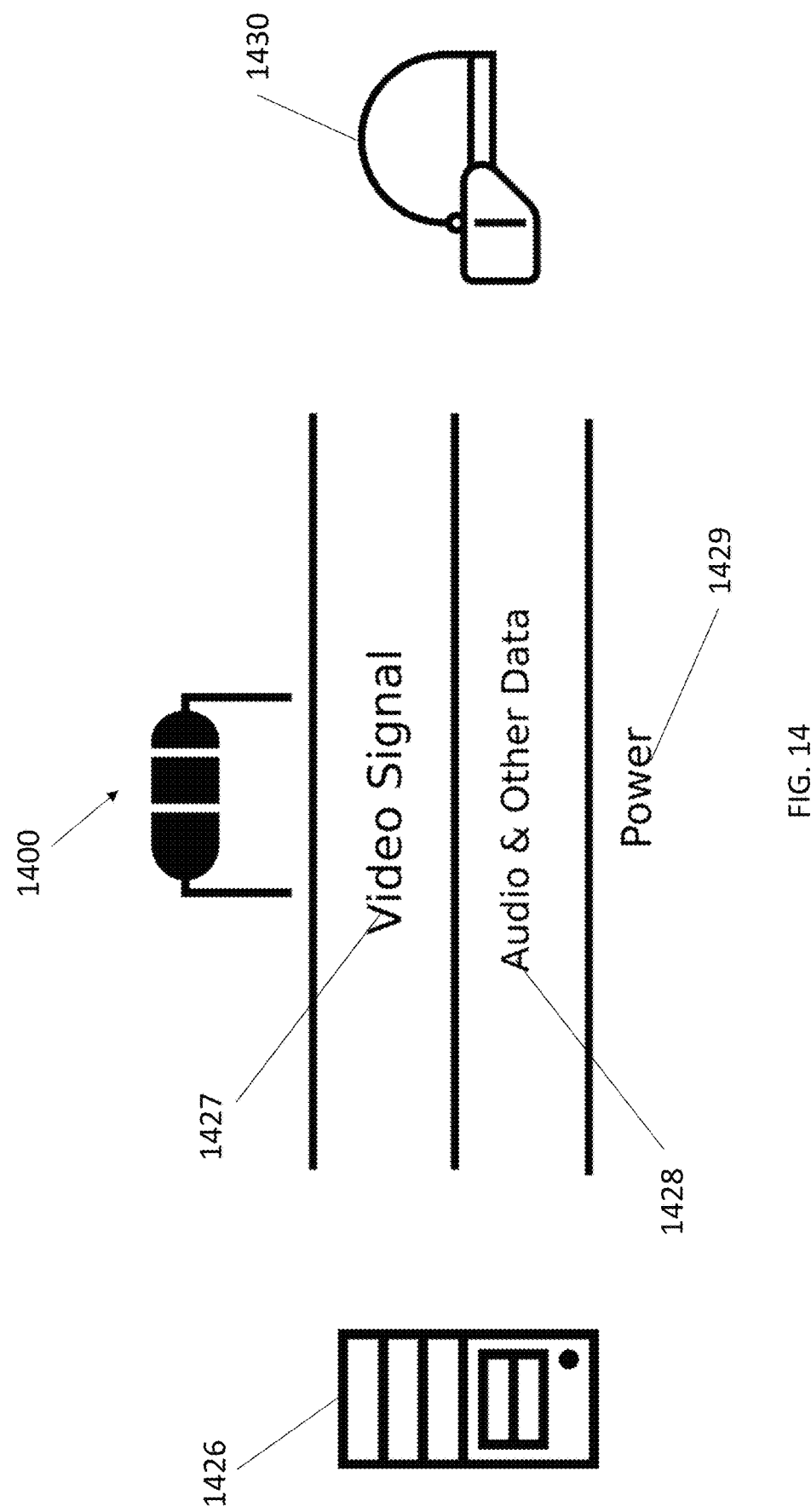
FIG. 14 illustrates an exemplary connection between a computer and a visualization device, according to exemplary embodiments of the present invention.

FIG. 14 illustrates an exemplary connection 1400 between at least one computer 1426 and at least one visualization device 1430 via three separated cables. Any number of cables that may or may not be separated may also be used. Video signal 1427 may use at least one Display Port. The audio signals and other data 1428 may use at least one USB or any other computer communication protocol and cable. The power may be supplied by a separated two-line power cable 1429. Any other forms of supplying the signals and power may also be employed.

Figure 15:
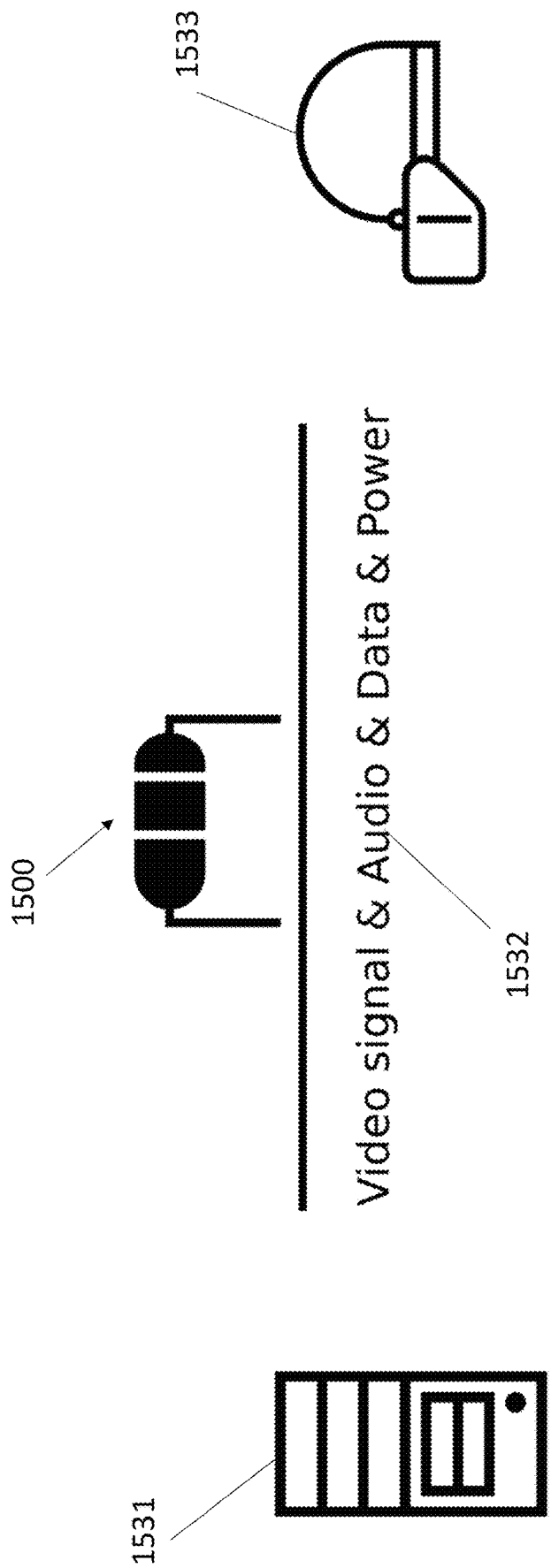
FIG. 15 illustrates an exemplary connection between a computer and a visualization device, according to exemplary embodiments of the present invention.

FIG. 15 illustrates an exemplary connection 1500 between at least one computer 1531 and at least one visualization device 1533. The signals 1532, such as video, audio, etc., and power may be transferred via one cable and/or port such as USB 3.0c cable using Thunderbolt 3 protocol. Any other forms of supplying the signals and power may also be employed.

Figure 16:
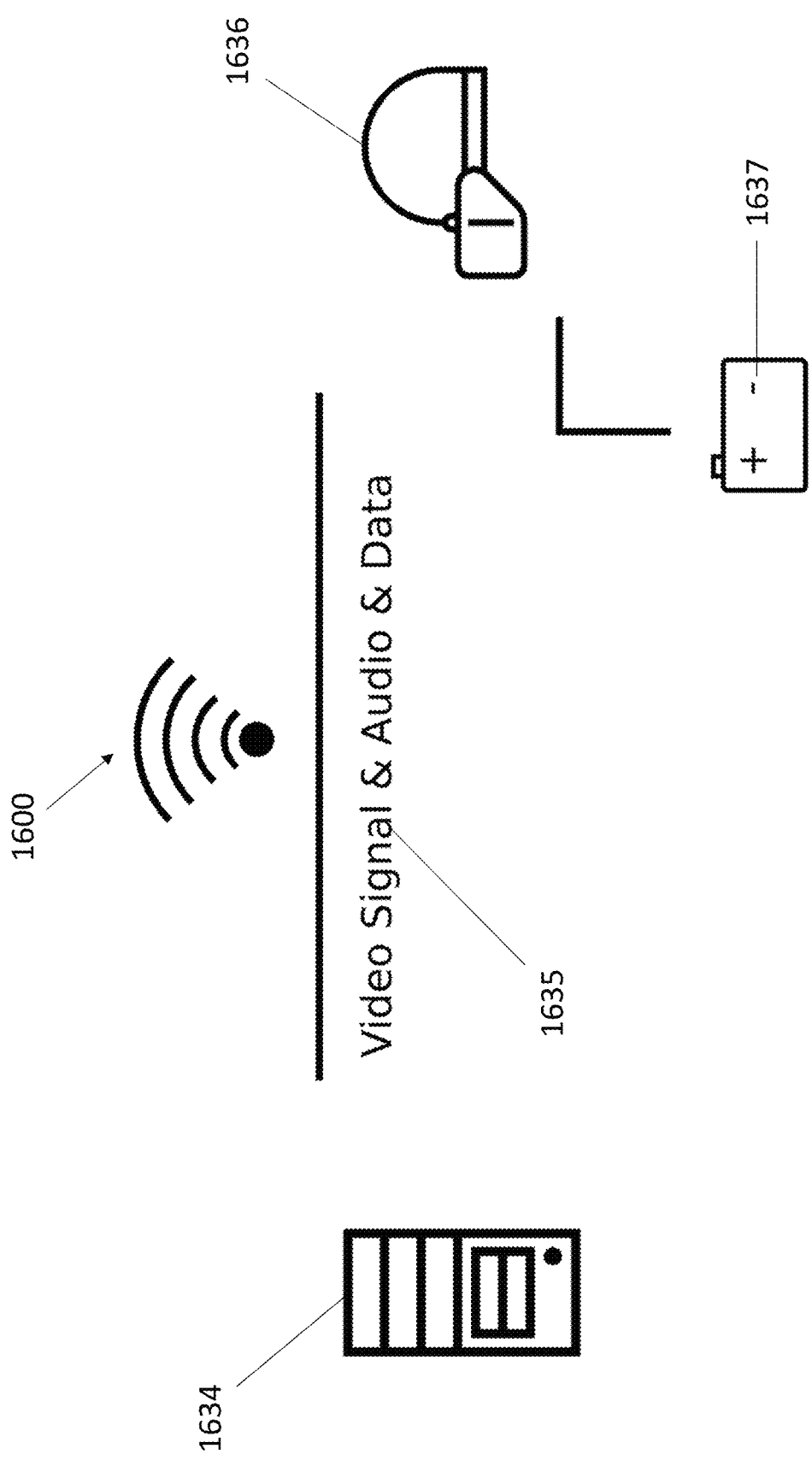
FIG. 16 illustrates an exemplary connection between a computer and a visualization device, according to exemplary embodiments of the present invention.

FIG. 16 illustrates an exemplary connection 1600 between at least one computer and at least one visualization device. Signals 1635, such as video, audio, etc., and all other data may be transferred via any wireless technology such as Wigig, Wifi, etc. The power supply may be separately provided using an external source 1637 such as a battery pack. Any other forms of supplying the signals and power may also be employed.

Figure 17:
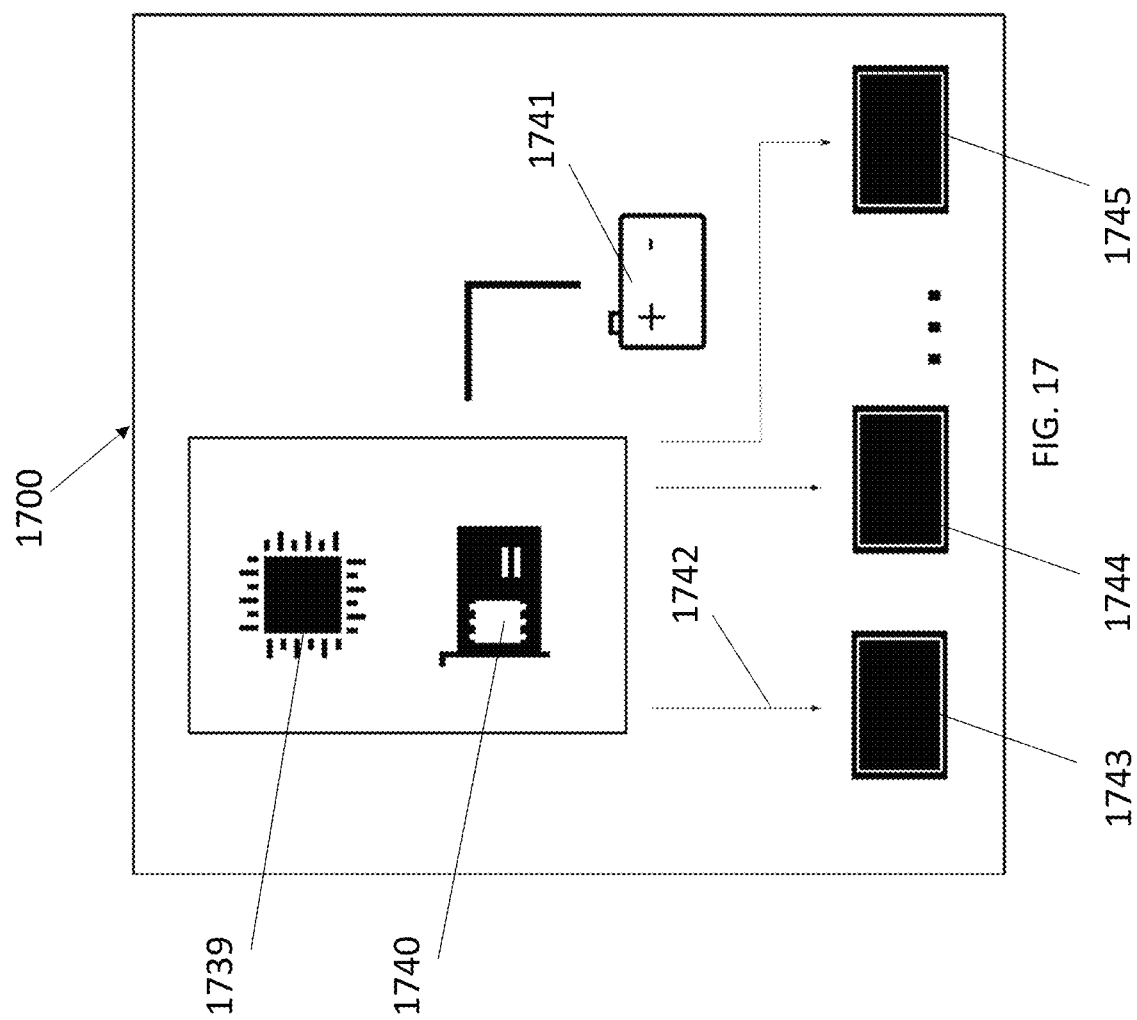
FIG. 17 illustrates an existing AR/VR all-in-one device with a high-level block visualization running via an integrated computer.

FIG. 17 illustrates an existing AR/VR all-in-one device with a high-level block visualization 1700. The standard all-in-one device 1700 includes a central processing unit 1739, video adapter 1740, and integrated displays 1743, 1744, 1745. The standard all-in-one device 1700 also includes a power battery pack 1741. Video signal 1742 is generated using at least one video adapter 1740 that is transferred via MIPI DSI directly to at least one display.

Figure 18:
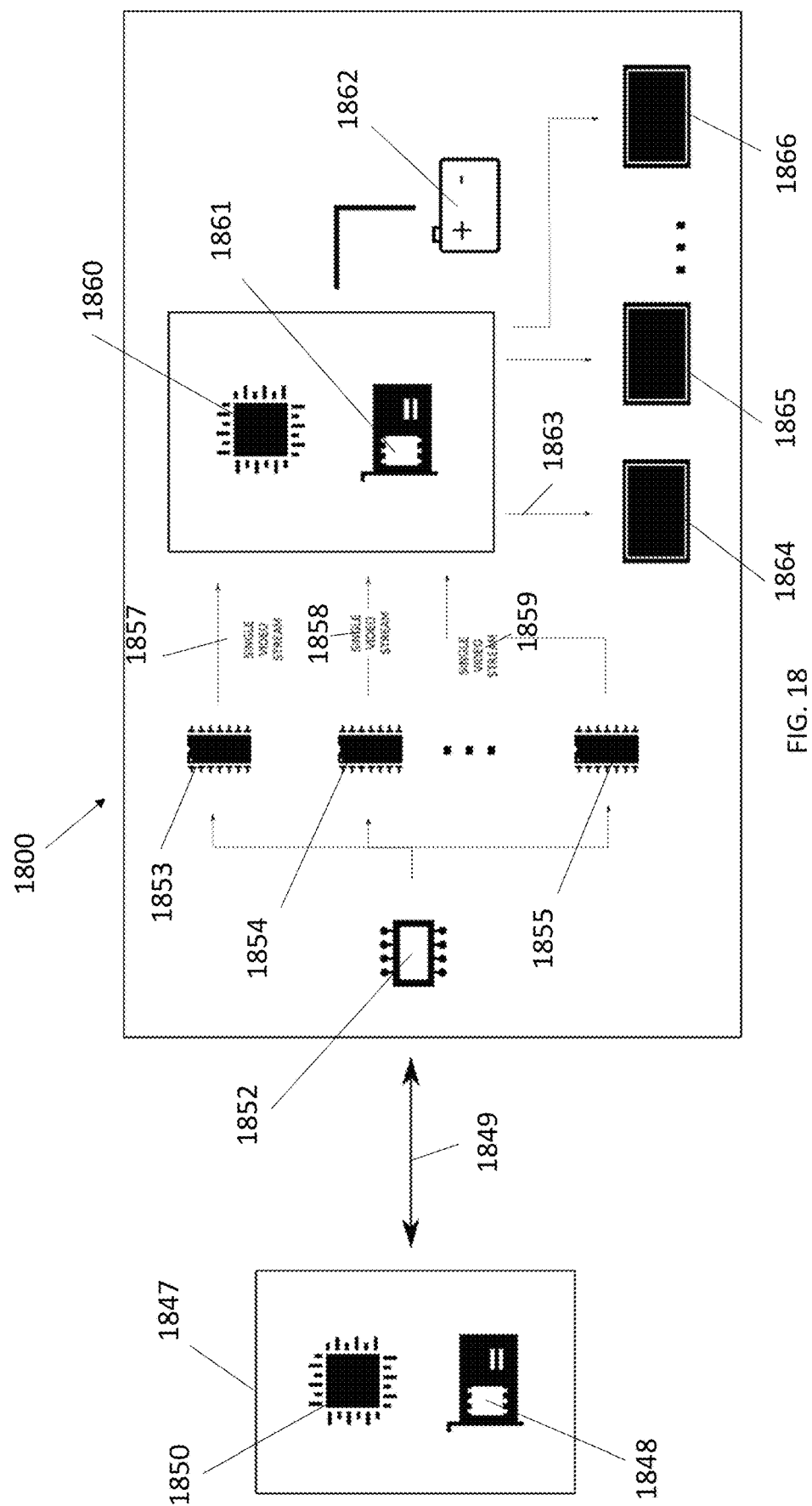
FIG. 18 illustrates an extended AR/VR all-in-one device with a high-level block visualization capable of switching between internal and external data sources, according to exemplary embodiments of the present invention.

FIG. 18 illustrates an extended all-in-one VR/AR device 1800 that may include at least one optional video splitter 1852 connected to at least one video chip (input video converters) 1853, 1854, 1855, which may transform data from video stream 1849 to MIPI CSI signal. Such a signal may be accessible by at least one central processing unit 1860 and at least one video adapter 1861. Extended all-in-one device 1800 may supply video signals 1863 to displays 1864, 1865, 1866 by itself or switch to external mode and provide single or multiple video streams 1849 to displays 1864, 1865, 1866 from at least one external computing device 1847, such as a computer, with separated central processing unit 1850 and a video adapter 1848. Power may be supplied by battery pack 1862.

Figure 19:
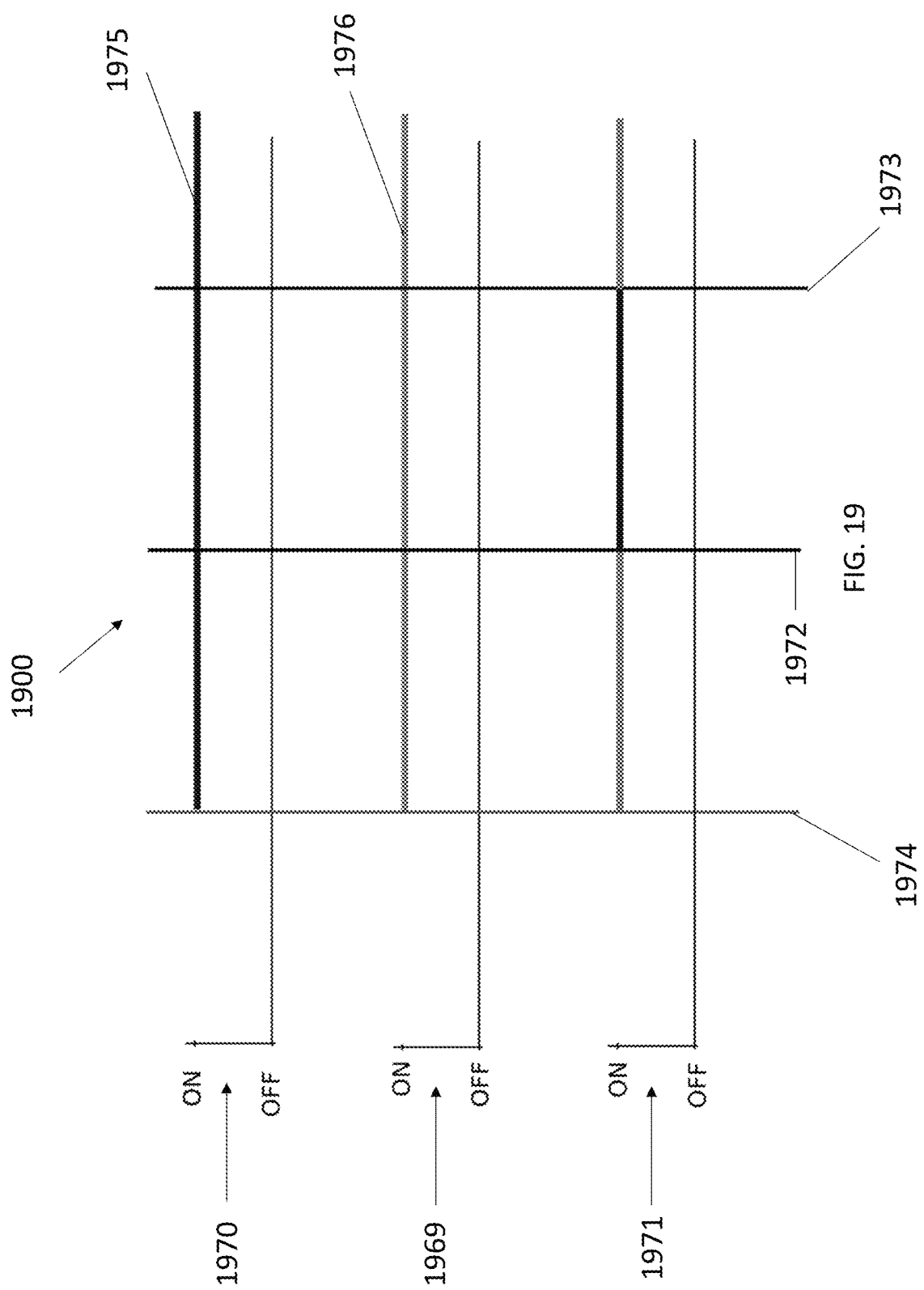
FIG. 19 illustrates video signals of AR/VR all-in-one devices, according to exemplary embodiments of the present invention.

FIG. 19 illustrates video signals 1900 of AR/VR devices, namely video signals in an all-in-one device 1969, video signals in a tethered device 1970, and video signals in an extended all-in-one device 1971. Blue line 1975 illustrates an external video signal being shown in the devices. The orange line 1976 illustrates an internally produced video signal being shown in the devices. As illustrated, when the devices are turned off, no signal is shown at all in any device. However, when the devices receive the ON IMPULS 1974, they immediately turn on and the all-in-one device 1969 may show video signal from an internal graphical adapter. Tethered device 1970 may show video signal from an external graphical adapter and the extended all-in-one device 1971 may show video signal from an external or an internal graphical adapter depending on previous setting. When the SWITCH IMPULS 1972 arrives, the all-in-one device and the tethered device are not able to accept it or react because tethered device only accepts the external video signal and the all-in-one device shows signal only from the internal graphical adapter. The SWITCH IMPULS 1972 is a signal/command, which is sent to the devices to let it know that it should change the data source. However, the extended all-in-one device accepts the SWITCH IMPULS 1972 and immediately changes the video signal from the external graphical adapter to the internal graphical adapter or the other way around. When the second SWITCH IMPULS 1973 arrives, the all-in-one device and the tethered device again ignore it and the extended all-in-one device accepts it. Subsequently, the internal processor, which controls all the video chips, immediately changes the video signal from the internal graphical adapter to the external graphical adapter.

In some embodiments, the visualization device utilizes several separate displays, resulting in greater data quality and wider field of stereoscopic view compared to one-display devices. The video signal from the computer may be fed through one single channel into a dedicated video signal splitter prior to further processing in a bridge converter and/or the actual display. This may substantially improve user-friendliness and usability, as the installation may be easier and natively supported on protocol layer and the display's capabilities may be exploited in the widest possible range. Unlike one signal, two separated signals may allow for a precise control of settings of separate displays including refresh rate, timing, resolution, synchronization, etc.

In some embodiments, the video splitter may accept multiple video stream, which may then be divided into X single video streams. This may be done by DisplayPort MST protocol, which splits one signal into multiple video signals using DisplayPort 1.2 or newer. On the other hand, a standard video chip (converter HDMI to DSI), which is used in existing devices, accepts one single video stream and directly shows signal on display. Further, existing devices with more displays and no splitter cuts single stream video signals into half using video convertor to make two displays operational. In some embodiments, the visualization device may use multiplexed signals from the computer, transferred by a video signal channel (typically a cable or a wireless interface), into a video signal splitter. Separate branches may continue from the video signal splitter, each leading to one video convertor and one or more displays, i.e. the video signal may be split into several separate branches. When the video signal is split, that video signal is still in standard and can be shown on any device (monitor, VR headset, television). If the video signal is cut, it cannot be transferred anywhere and is no longer a standard signal and it can be shown only on a directly connected screen. In some embodiments, during the backward communication (i.e. configuration, diagnostic and other data sent from the displays into the computer), the signal from the displays communicated via the separate branches may be merged in the video signal splitter and sent via the single video signal channel into the computer's video adapter. Backward communication and all its data are part of DisplayPort communication protocol standard. Backward communication is a native function of all visualization devices for handshake and connection establishment. Additionally, backward communication allows to send data in different formats as defined by DisplayPort AUX channel. The visualization device may be identified by the computer either as one display combining all the information about the data, such as pixels of an image, physically distributed between the separate displays in the visualization device or as several separated displays. The identification may be handled by Extended Display Identification Data (EDID), which is a Video Electronics Standards Association (VESA) standard. In some embodiments, as described above, the device may include two or more displayed virtual reality headset that may use a DisplayPort interface as video signal channel between the computer and the headset. However, in other embodiments, other than a DisplayPort, the device may utilize HDMI, USB-C Thunderbolt, Wigig, Wifi, or any other current or future wired or wireless video interface as well. Similarly, any number of displays may be used in the device. All commercially available and disclosed all-in-one visualization devices utilize only internally generated video signal without any option to directly connect an external computer without causing massive downgrade of the picture or adding more latency. Some examples of available visualization devices include: Samsung Gear, which is a mobile phone with no direct video input; Azpen AZ-VR Nibiru Allwinner, which is a standalone all-in-one VR headset with no direct video input; VR-8, which is a standalone all-in-one VR headset with no direct video input; GenBasic Quad HD Android Virtual Reality System, which is a standalone all-in-one VR headset with no direct video input. These standard all-in-one VR/AR headsets utilize processors with integrated video adapter in one chip. This approach is perfectly correct and works. However, its performance is limited.

Unlike those devices, in some embodiments, the AR/VR device may provide the same capabilities for completely standalone usage and also allow users to use full performance provided by desktop computers and servers. Thus, in some embodiments, the benefits of all tethered and untethered visualization devices may be included within the AR/VR device. In some embodiments, the video signal from an external source may be a single video stream as well as multiple video streams. The external signal may be transferred via any cable or any wireless channel which allows direct connection. In some embodiments, the AR/VR device may utilize all-in-one VR/AR headsets with additional chips that may allow the device to switch between internal and external video signals. Thus, one AR/VR device may work independently, but if available, it may also utilize external processing power such as external computer, server, etc. If connected to a computer, in some embodiments, the AR/VR device may be identified either as one display combining all the information about the data, such as pixels of an image, physically distributed between the separate displays in the AR/VR device or as several separated displays. Thus, in some embodiments, two functions may be combined to create a standalone AR/VR visualization device, which provides video signal from its own integrated hardware components, combined with switching function to an external mode, in which the AR/VR device accepts external video signal from any kind of source and projects it to internal displays, using tethered or untethered connection and a single or multiple video stream.

Figure 20:
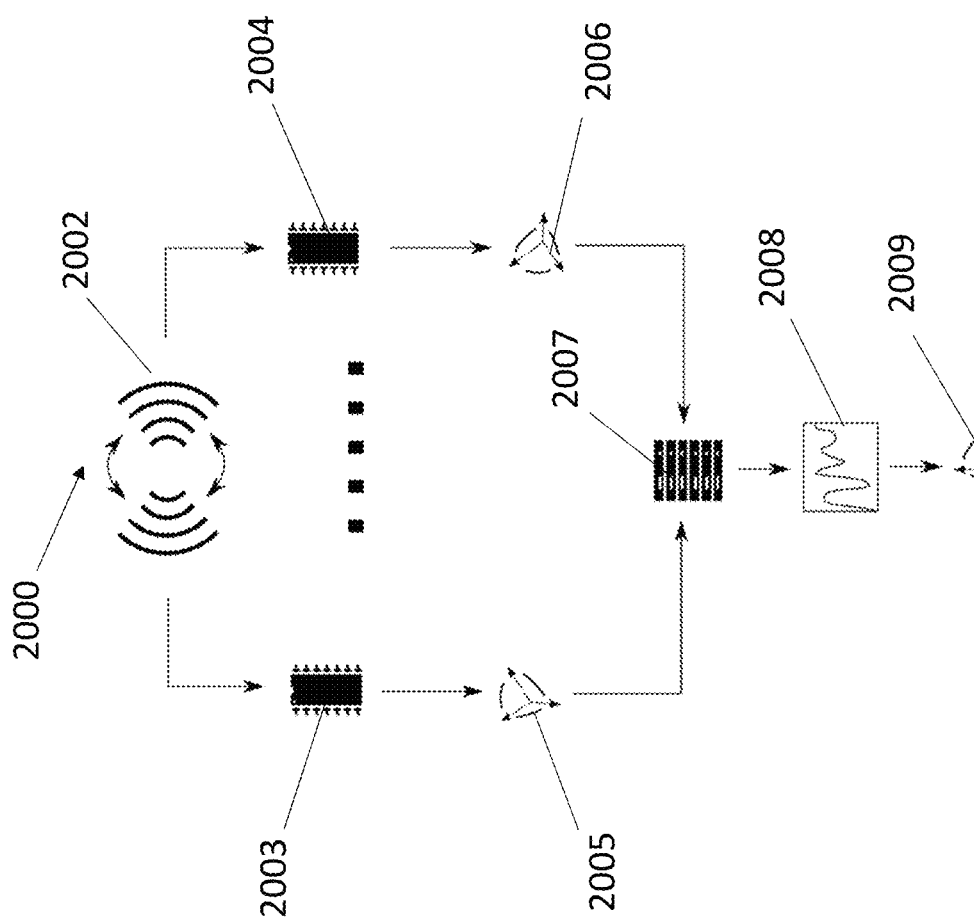
FIG. 20 illustrates a standard IMU setup with data flow operations.

FIG. 20 illustrates a standard IMU setup with data flow operations 2000 from start to end as a process. When first movement 2002 is recognized by the IMU sensors 2003, 2004 data is measured. Such data is transformed to right axes by axis transformation 2005, 2006. Next, data fusion 2007, which merges data together mostly to obtain more accurate information, occurs. Next, prediction algorithm 2008 is applied and final orientation 2009 is established. The prediction algorithm uses actual orientation and measurements to predict future orientation. This is useful for mitigating perceived lag by the user. The typical prediction horizon is around 20-60 meters. It is important to find the right value for the horizon when using prediction. When the horizon is too small, the prediction does not help to reduce the lag. If it is too large, it will introduce overshoots into the estimation and the result will look very shaky.

Figure 21:
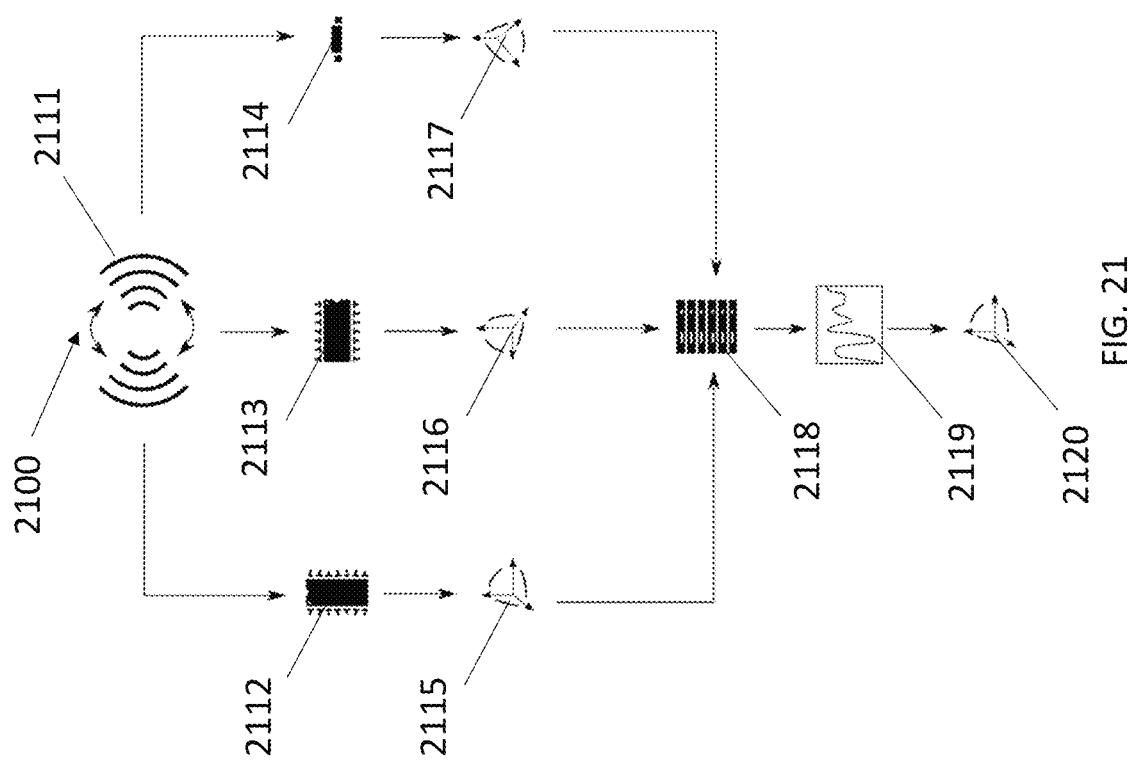
FIG. 21 illustrates axes IMU setup with data flow operations, according to exemplary embodiments of the present invention.

FIG. 21 illustrates a unique IMU setup as a part of data flow operations 2100. In some embodiments, when the first measurable movement 2111 occurs, it is recognized by the IMU sensor 2112, IMU sensor 2113, and/or IMU sensor 2114. Subsequently, data is measured. Such data needs to be transformed to right axes by axis transformation 2115, 2116, 2117. Next, in some embodiments, data fusion 2118, which merges data together, may occur. Data fusion 2118 in this specific setup can operate in two different modes. First mode can use different algorithms to achieve better quality in native frequency of IMUs. Simple moving average will lower the impact of physical mistake of IMU construction by ⅔, when each IMU is positioned as described above. Other option is to use signals from two IMUs out of three expecting that the third one is most influenced by the mistake and is more different than the other two. Another approach may be to use only one signal of rotation in one axis from one IMU and ignoring the rest of the signals. Other approaches may be used as well. These different options of filtering and handling IMU signals to achieve more precise measurement data, using multiple IMUs may be used separately or in combination with any other methods. In other embodiments, data from all three IMUs may be used simultaneously. In this scenario, each IMU may need to measure and send data spaced in between the data from the other IMUs, thus tripling the frequency. In some embodiments, raw data from an IMU, which measured the signals in the current step, may be summarized with ⅓rd of the prediction of measurement from different IMUs from the previous steps and with ⅔rd of the prediction of measurement from different IMUs from the step before, thus lowering the influence of manufacturing mistake by half. After data fusion 2118, prediction 2119 is applied, and final orientation 2120 may be established.

Figure 22:
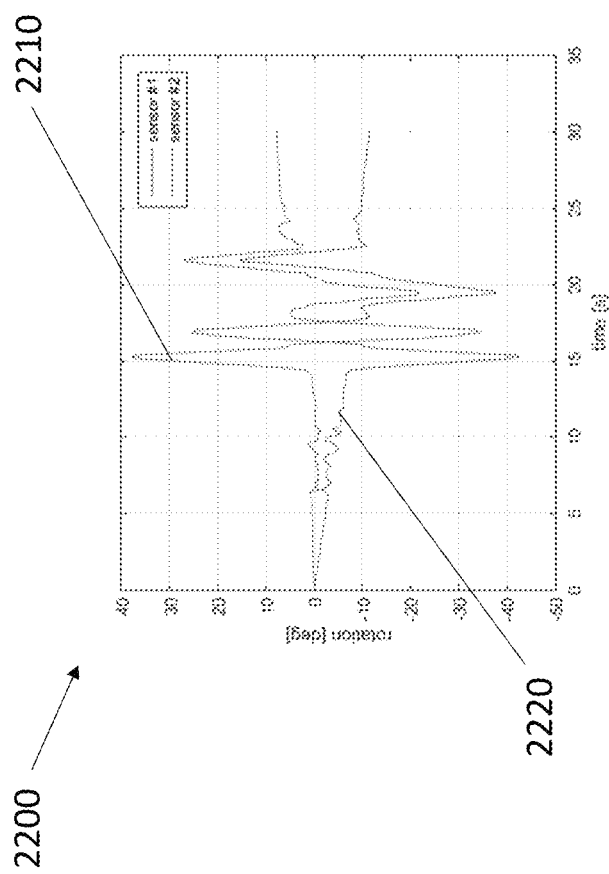
FIG. 22 illustrates measurements from different sensors in different coordinates frames, according to exemplary embodiments of the present invention.

FIG. 22 illustrates measurements from different sensors in different coordinates frames 2200. Specifically, example signals 2210, 2220 of parallel measurement using two IMUs (sensor #1 and sensor #2, respectively) in indifferent axes are illustrated.

Figure 23:
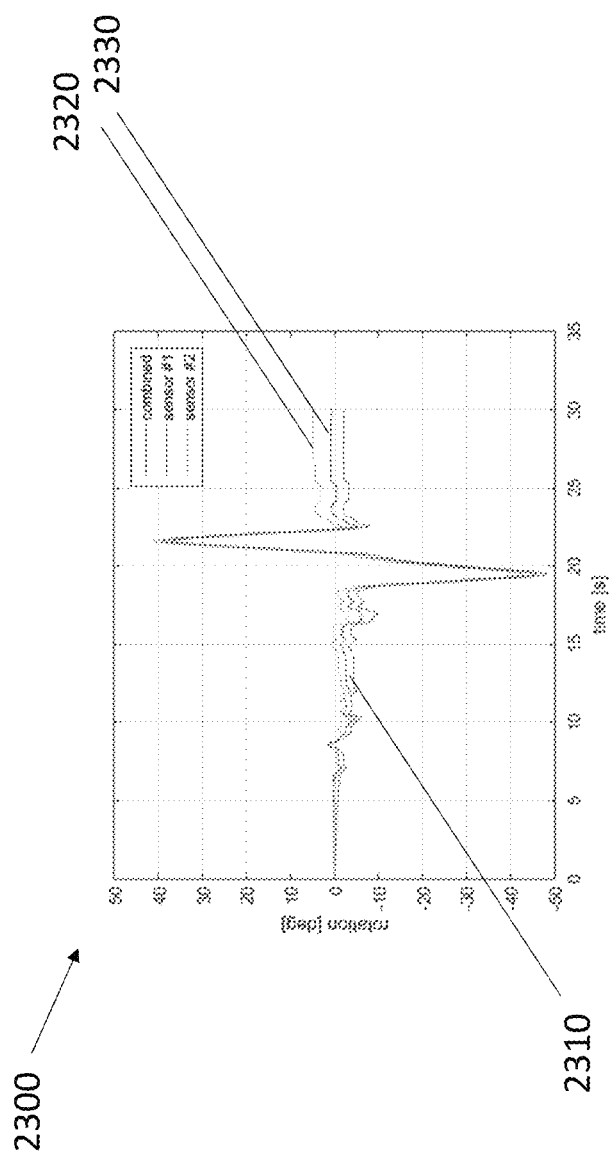
FIG. 23 illustrates combined measurements from two sensors transformed to common coordinates frame, according to exemplary embodiments of the present invention.

FIG. 23 illustrates a combined measurement graph 2300 with a combined signal 2330 from two sensors, transformed to common coordinates. First IMU generates signal 2320. Second IMU generates signal 2310. Both signals 2310 and 2320 are already transformed to common coordinates (axes). Specifically, the combined signal 2330 of parallel measurement using two IMUS (sensor #1), (sensor #2) in indifferent axes is illustrated.

Figure 24:
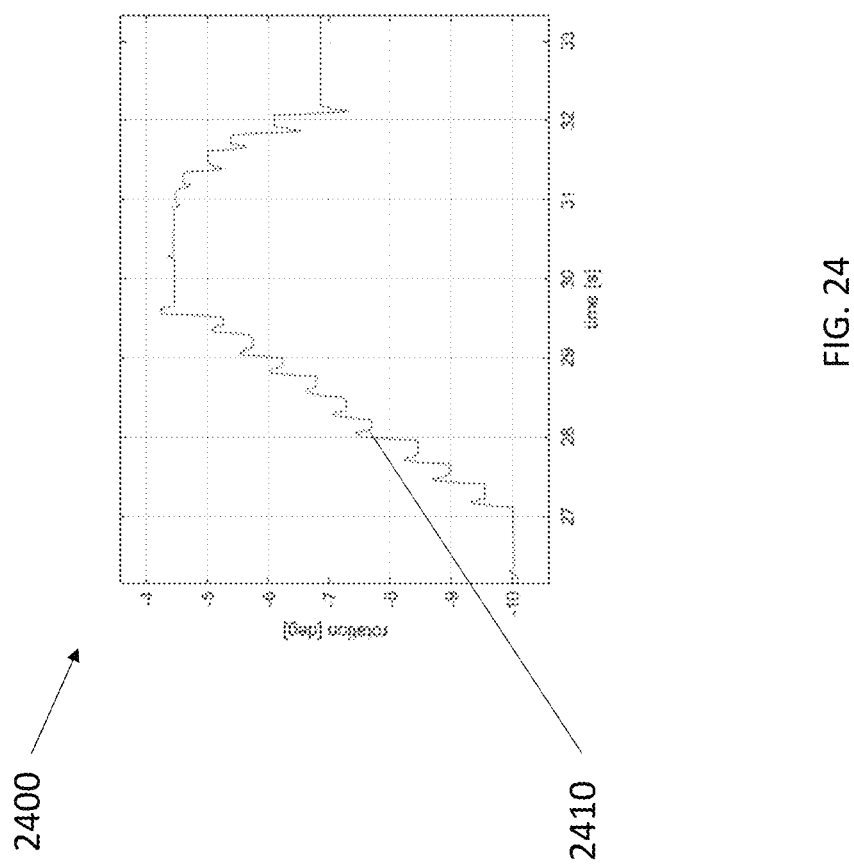
FIG. 24 illustrates data prediction setup with high prediction, according to exemplary embodiments of the present invention.

FIG. 24 illustrates a data prediction setup graph 2400 with high prediction from one IMU. As illustrated, there is a visible ringing signal 2410, which shows that prediction algorithm horizon is too high. This signal has a badly adjusted prediction algorithm.

Figure 25:
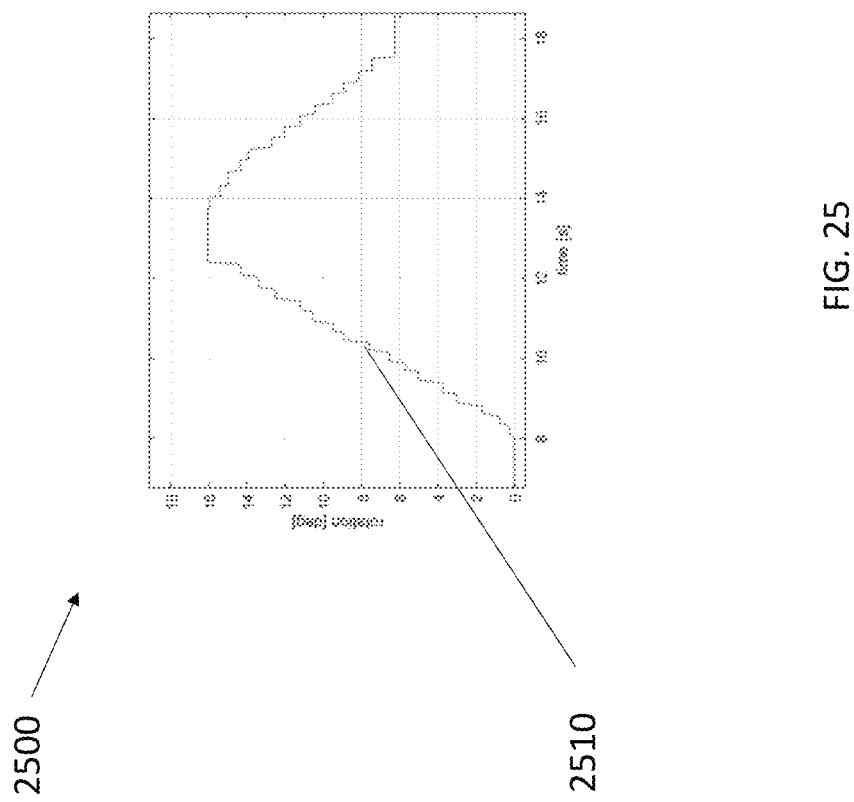
FIG. 25 illustrates data prediction setup with automatic prediction, according to exemplary embodiments of the present invention.

FIG. 25 illustrates a data prediction setup with automatic prediction graph 2500. As illustrated, there ringing signal 2510 is very low and is almost an immediate response to change, which shows rightness of the setup. This signal has a well-adjusted prediction algorithm.

In some embodiments, the AR/VR devices use gyroscopes, accelerometers, and/or magnetometers. By using multiple sensors together, the efficiency, working, robustness, sampling frequency, etc. of these devices can be improved. In some embodiments, the redundancy of sensors could be exploited by data fusion to provide better overall precision. To do this, some linear or nonlinear Bayesian filters may be developed and tested. In some embodiments, the sensors may be placed in different coordinates frames and therefore, the axis transformations may be required before the final data fusion. The sensors may also be placed in the same coordinate frames. The sensors could be read out asynchronously to improve the speed at cost of lower accuracy.

In some embodiments, prediction algorithm may be employed. Prediction algorithm uses actual orientation and measurements to predict future orientation. This is useful for mitigating perceived lag by the user. The typical prediction horizon is around 20-60 meters. However, the prediction horizon may be less or more than 20-60 meters. It is important to find the right value for the horizon when using prediction. When the horizon is too small, the prediction may not help to reduce the lag. When too large, it may introduce overshoots into the estimation causing the result to look shaky. Thus, in some embodiments, to solve this issue, an algorithm that sets the prediction horizon depending on the actual angular rate may be employed. The algorithm may have a static prediction time horizon of 20 meters up to a speed of 30 degrees per second. It may also have a linear progression horizon of meters with 120 degrees per second. Any speed above 120 degrees per second will be saturated at 60 meters prediction horizon. Thus, when the HMD turns slowly, the prediction is low to reduce the shakiness. And when the HMD turns quickly, the prediction is higher to improve the responsiveness. In some embodiments, there may be an IMU sensor mesh, which may use at least three combined IMUs and where no two IMUs have the same axes orientation.

Figure 26:
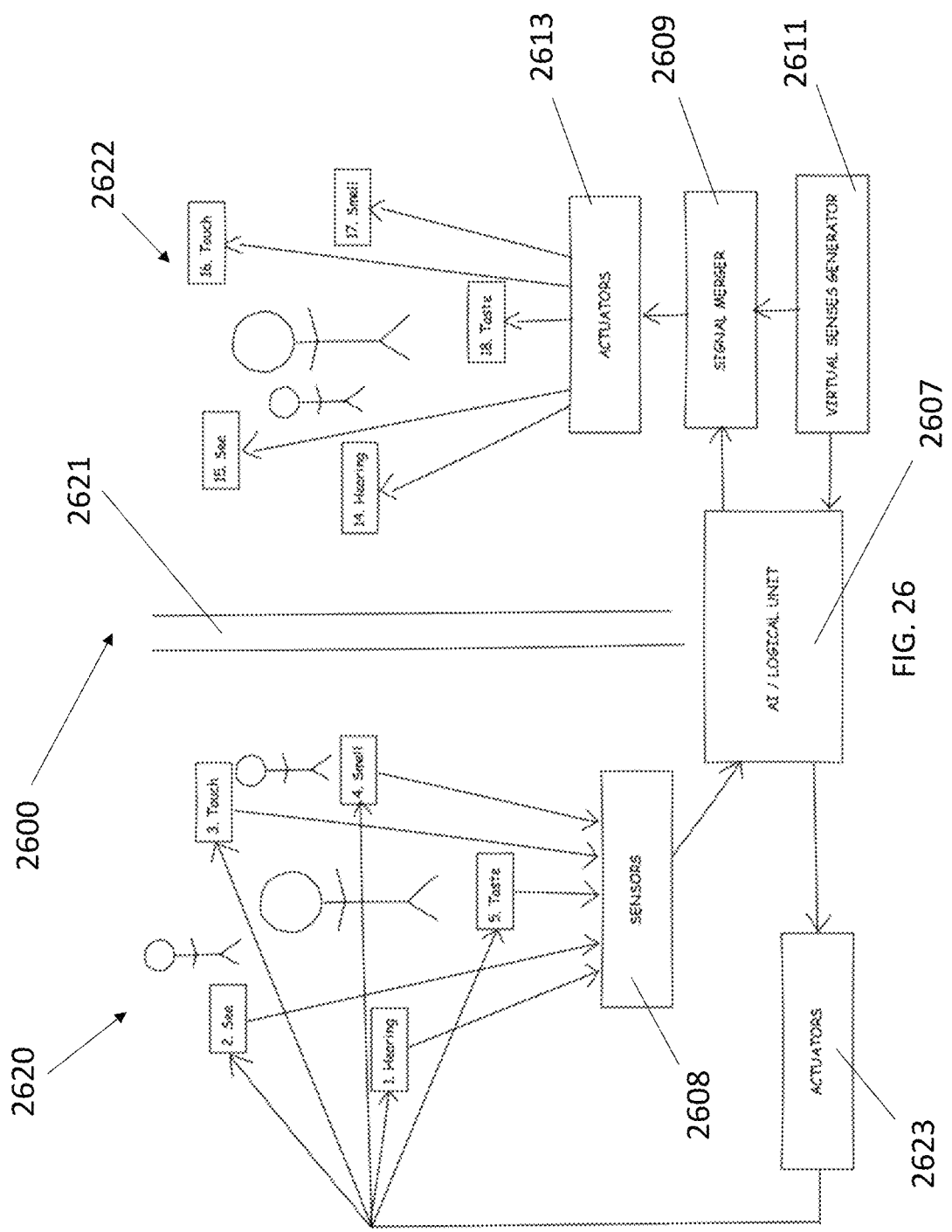
FIG. 26 illustrates a system for information transport between real and virtual environments, according to exemplary embodiments of the present invention.

FIG. 26 illustrates a system 2600 for information transport between real and virtual environments. As illustrated, in some embodiments, there may be an information flow between the real environment 2620, where people are present, and the virtual environment 2622 where, user/users are. People in the physical environment 2620 can hear, see, touch, smell, and/or taste their surroundings. All these senses can be measured by sensors 2608 of real world, such as microphones for hearing, chemical sensors to detect smell and taste, tension sensors to detect touch, cameras for sensing sight, etc. These sensors may transfer the information in the form of digital signals, to AI/logical unit 2607. The logical unit 2607 may comprise of any kind of processor, co-processor, FPGA, etc. that can run AI (artificial intelligence) and/or perform predefined logical operations. The logical unit 2607 decides which signal, in which form and intensity will be sent from one environment to the other. In the virtual environment, signals from the real environment may be merged by a signal merger 2609 with generated virtual signals from a virtual signal generator 2611 and provided to user/users via actuators 2613 such as displays, headphones, smell generators, flipping platforms, haptic gloves, etc. From the opposite side, virtual signals may be also transferred to the real environment 2620 through the logical unit 2607. When this happens, the barrier between the two environments 2620, 2622 is overcome and these two or more worlds are able to communicate with each other. To provide information about virtual signals, actuators 2623 in real environment 2620 are used to communicate with users in virtual environment 2622.

Thus, in some embodiments, the real world (physical environment 2620) and virtual reality (virtual environment 2622) may be connected using an AR/VR device. The AR/VR device may obtain information about the events in both environments and it may be able to further share this information resulting in an interconnection between the real environment 2620 and virtual environment 2622 and reduction of risks. This interconnection between the two environments 2620, 2622 may be provided by any device/actuator, which provides fake information for any of the human senses: sight, hearing, taste, smell, or touch, and not just an AR/VR HMD device. In some embodiments, sensors may be used to measure information and warn the users of any outside-world dangers or of any important differences between the two environments 2620, 2622. Further, in some embodiments, the device may be able to inform an outside observer about the events occurring in the virtual environment 2622. The signalization may be used in one or both directions; it may be realized by one or multiple senses; and it may even use a different sense in each environment 2620, 2622 and/or in between the environments 2620, 2620.

In an exemplary embodiment, person A (a virtual reality user) may use audio headphones with high sound intensity, which makes it difficult or even impossible to pay attention to the real-world sounds. If there is also a microphone (sensor) connected to the system, it may be used to listen to the real environment. The processing unit, such as the logical unit 2607, may evaluate all external sounds and in case of any unusual sounds (alarm sound, loud unexpected noise, unusual silence, or a voice directed at person A), it may inform the person A about the unusual sound. The system 2600 may inform person A by either lowering the sound from the virtual environment (in urgent cases) or by creating a personalized message, which may seamlessly play along with the virtual sound without drastically disrupting the user experience. At the same time, the information about the sound intensity in users' headphones (virtual environment) may be shown by RGB LEDs on the device and may transfer that information to person B (outside observer, who does not hear the sound from the headphones themselves). Thus, in some embodiments, the transfer of hearing information from the real environment 2620 to the virtual environment 2622 may be done through personalized message and/or the transfer of volume information from virtual environment 2622 the real environment 2620 may be done through visual signals provided by LEDs or any other lighting source (sight). Other senses and devices may be used for both the processes as well.

In some embodiments, the device that facilitates transfer of information between the real and the virtual world may include devices which provide virtual information (headphones, VR headset, haptic wearables, moving platforms, etc.); sensors which measure outside (real world) information (microphone, camera, chemical sensors, environment tracking devices, etc.). In some embodiments, this information may be measured beforehand and stored in the decision making unit (e.g. static mapping data about physical surroundings which don't need to be updated often); devices which provide information to the real world (RGB LEDs, audio speaker, display, etc.); devices which merge virtual information with the data obtained from the real-world sensors; and at least one decision making unit which evaluates all information and decides how to send important data to the real world or to the virtual reality.

Figure 27:
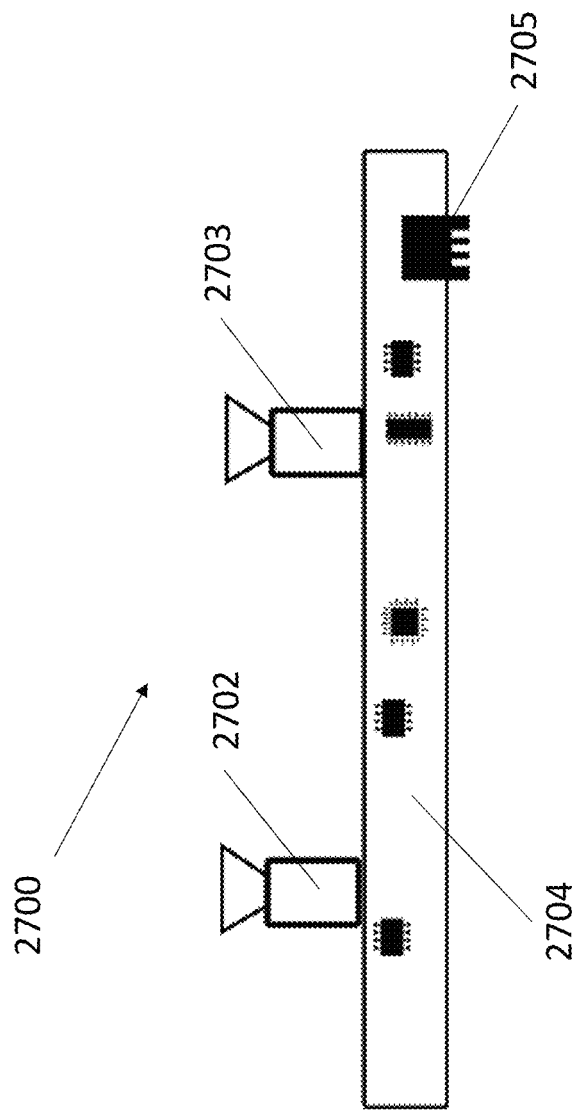
FIG. 27 illustrates an existing XR/AR module.

FIG. 27 illustrates a standard XR/AR module 2700. The standard XR/AR module 2700 includes a static left camera 2702 and a right camera 2703, both facing out. Their data is gathered and transformed to USB, or any other communication protocol using camera related electronics 2704, which is a printed circuit board controlling cameras. The camera related electronics 2704 is connected to internal electronics of HMD or to a computer using an USB or any other cable/connector 2705.

Figure 28:
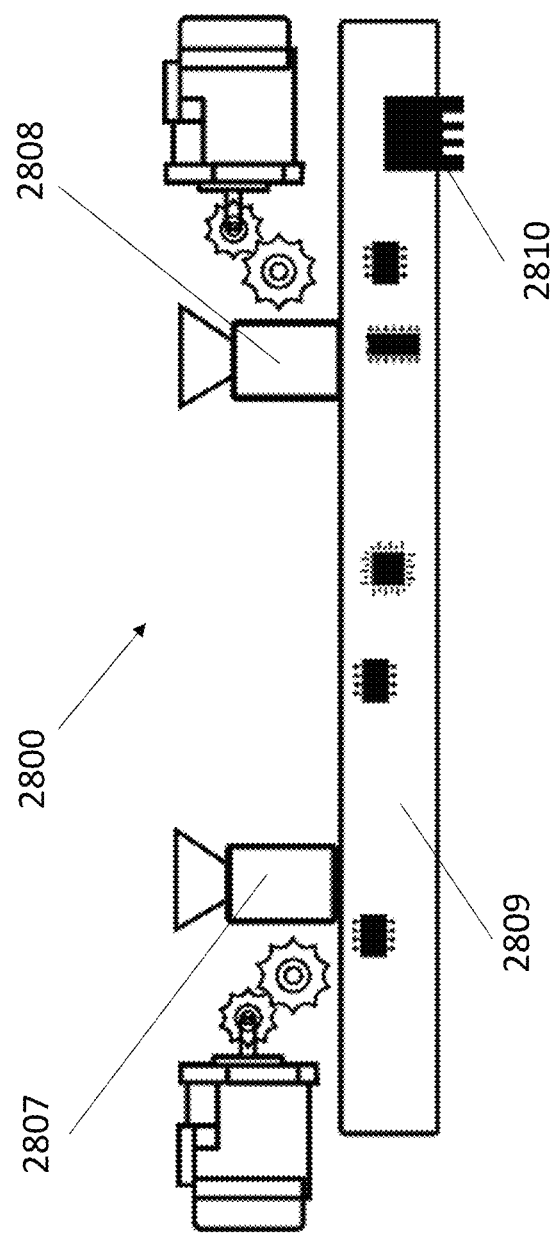
FIG. 28 illustrates an advanced XR/AR module, according to exemplary embodiments of the present invention.

FIG. 28 illustrates an advanced XR/AR module 2800. The advanced XR/AR module 2800 may be able to adjust camera distance using an automatically adjustable left camera 2807 and an automatically adjustable right camera 2808, both facing out. Cameras 2807, 2808 may be as close as possible to human eye vision and use actuators to get into the exact measured position as the user's eyes. This module is ideal to connect with advanced eye tracking system described above. Data from camera may be gathered and transferred to an USB or any other data protocol with sufficient bandwidth using camera related electronics 2809. Related electronics 2809 may include printed circuit board, flex cable, rigid flex cable, controlling cameras, etc. It may include devices that supply power to the cameras, control the signals to the camera and it may also include devices that accept data from the camera and/or transform them into any protocol standard which allows data to be transferred to the HMD or computer, such as USB, TCP/IP and others. Camera related electronics 2809 may connect to internal electronics of an HMD or to a computer using any usable connector such as USB 2810. This setup simulates the position of a user's eyes and therefore provides more realistic, believable, and more comfortable experience.

Figure 29:
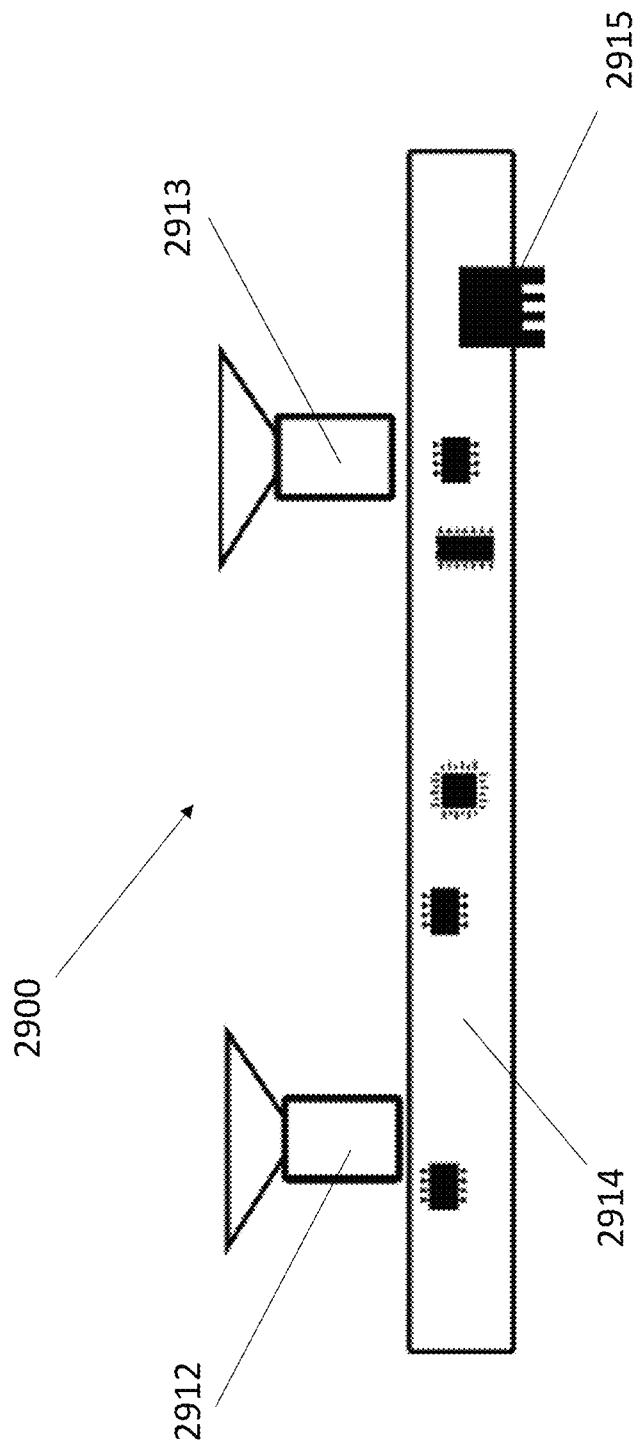
FIG. 29 illustrates a simulated XR/AR module, according to exemplary embodiments of the present invention.

FIG. 29 illustrates a simulated XR/AR module 2900. The simulated XR/AR module 2900 may include a left wide-angle static camera 2912 and a right wide-angle static camera 2913. Both cameras are facing out and may be capable of capturing a much wider field-of-view than the human eye. Camera related electronics 2914 or connected computer may alter the data, such as cropping an image, to fit into a position that mimics the location of the user's eyes and simulate correct a camera position. Data may then be transformed into USB standard and sent to internal electronics of HMD or to a computer using any usable connector such as USB 2915. This setup emulates the position of human eyes and therefore provides more realistic, believable, and a more comfortable experience than a standard setup.

Figure 30:
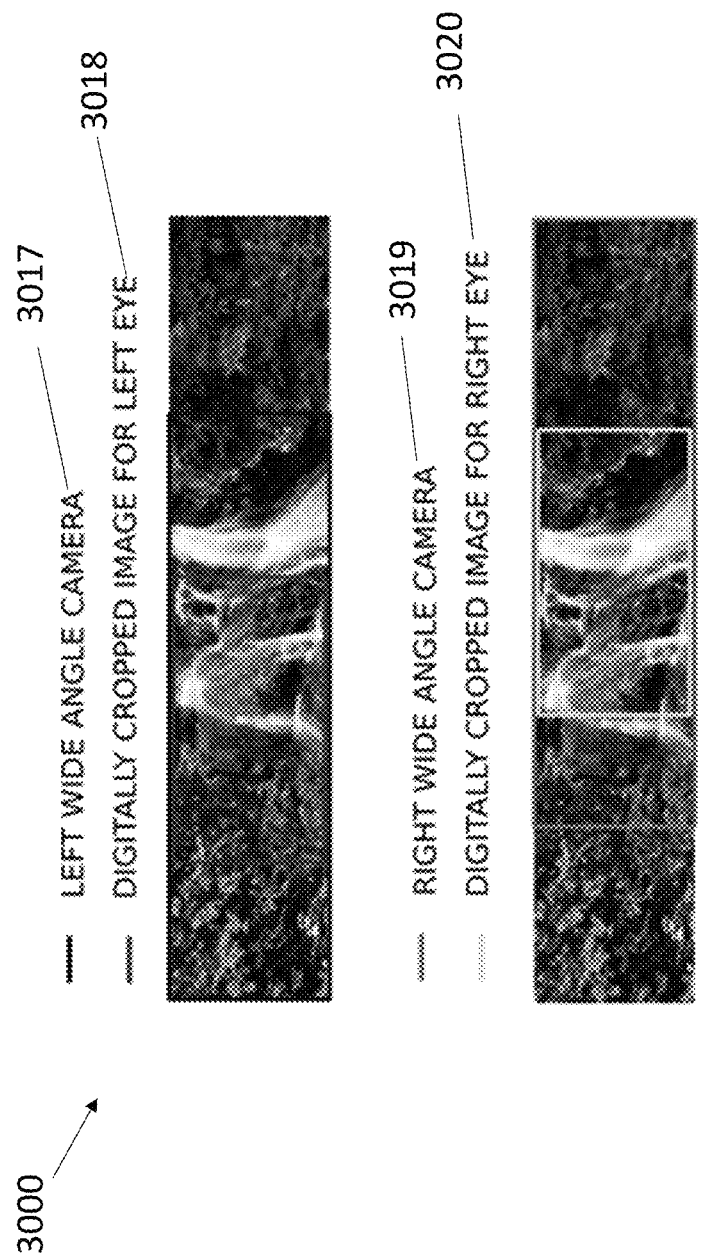
FIG. 30 illustrates a digitally-simulated distance between a user's eyes, according to exemplary embodiments of the present invention.

FIG. 30 illustrates a digitally simulated distance between a user's eyes 3000. As illustrated, the digitally simulated distance between a user's eyes 3000 visualize how video signal from left wide-angle camera 3017 and right wide-angle camera 3019 look like. Such signals may be cropped in real time using a processor or graphical adapter to simulate different distances between the cameras. Digitally cropped image for the left eye 3018 shows a subset of a picture that is projected to an HMD and emulates the difference between nose, camera, and the left eyeball. Digitally cropped image for the right eye 3018 shows a subset of picture that is being projected to an HMD and emulates the difference between nose, camera, and the right eyeball. If another user with a wider distance between the eyes uses the same device, red rectangle 3018 will be more on the left side and yellow rectangle 3020 will be more on the right side, thus emulating distance between the new user's eyes. Thus, in some embodiments, the AR/VR experience is significantly improved by providing the exact data as perceived in real environment or by simulating the same. Some examples of available visualization devices include: Acer Windows VR Headset Dev Kit that uses two static cameras without digitally simulated distance; HP Windows VR Headset Dev Kit that uses two static cameras without digitally simulated distance; and DELL Windows VR Headset Dev Kit that uses two static cameras without digitally simulated distance.

Figure 31:
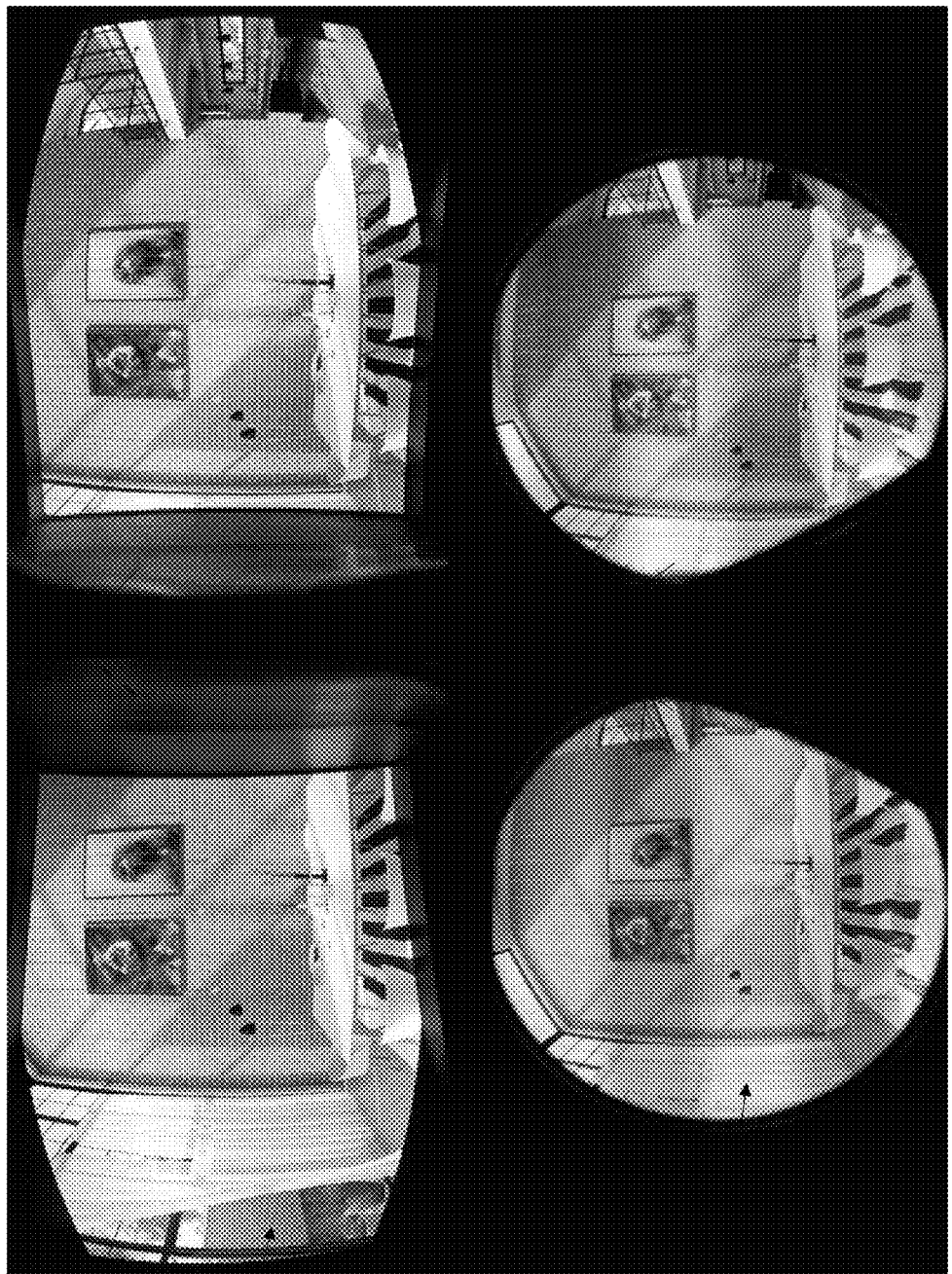
FIG. 31 illustrates exemplary images of the visible field-of-view of two different existing VR headsets.

FIG. 31 illustrates exemplary images of the visible field-of-view of two different existing VR headsets 3100 and 3150. As illustrated, images 3101 and 3102 depict a user's field-of-view. The first headset 3100 has a wide field-of-view, offering 150 degrees field-of-view, which is above average. The typical field-of-view of in the currently available headsets, such as 3150, is 110 degrees, which is illustrated in image 3102.

Figure 32:
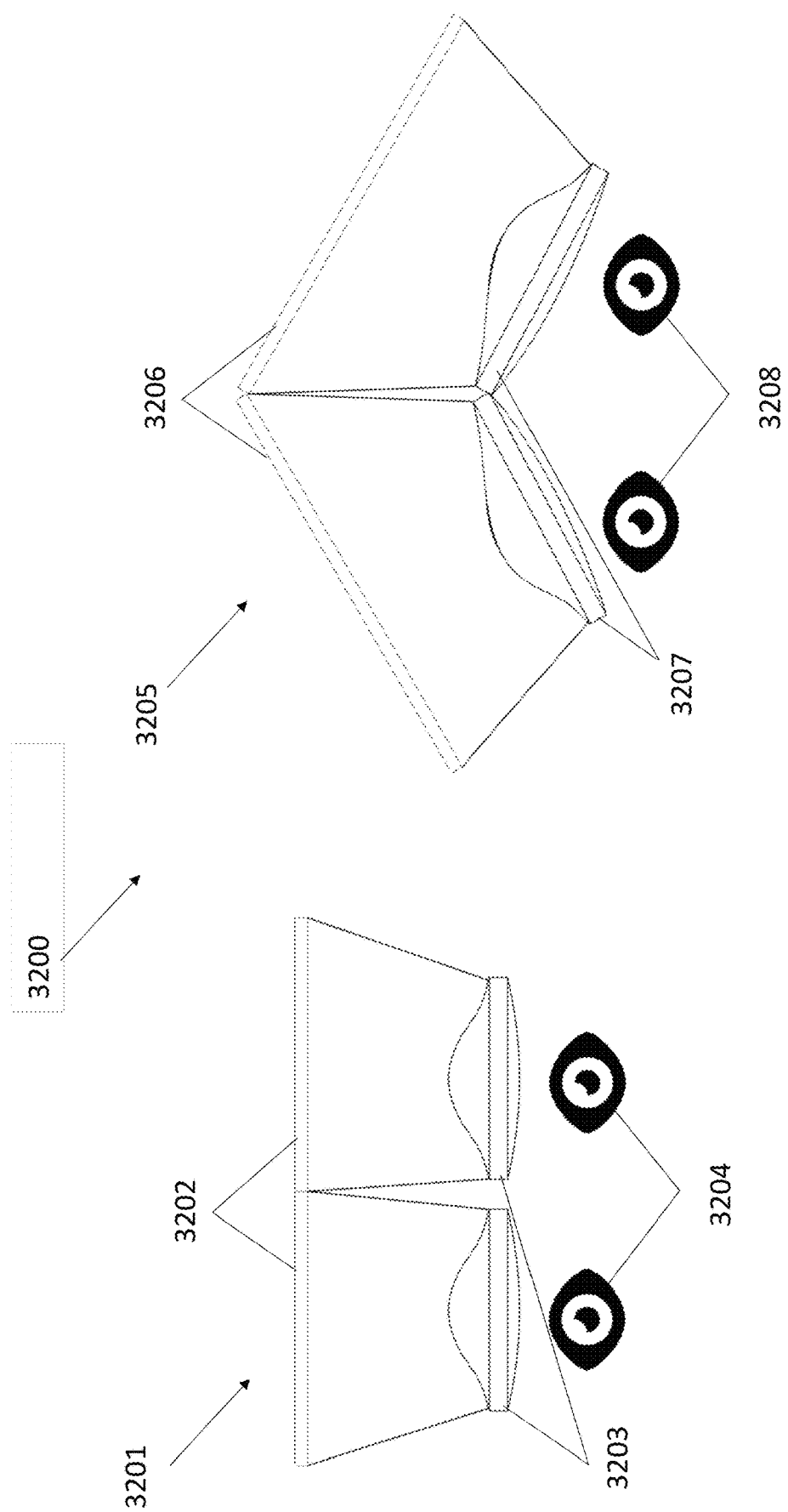
FIG. 32 illustrates two most commonly available setup of VR headsets.

FIG. 32 illustrates two most commonly available setup of VR headsets 3201 and 3205. VR headset 3201 shows a setup with a standard position of displays 3202 and lenses 3203 with respect to a user's eyes 3204. As depicted, the displays 3202, lenses 3203, and the user's eyes are linearly positioned in a way that they are parallel to each other. This setup is the easiest to compensate for image distortion. VR headset 3205 shows a setup with tiled displays 3206. The displays 3206, as well as lenses 3207 are positioned at an angle focused towards the user's nose. This setup allows to create a more immersive VR headset, which has wider field-of-view, because the displays 3207 can lead behind the eyes 3208.

The VR headsets depicted in FIGS. 31 and 32 suffer from many issues, such as image distortion and chromatic aberration, because of their non-flexible displays and lenses. Thus, there is a need, as met by embodiments described herein, for flexible displays and a new type of lenses. The flexible displays and the new lenses allow for a wide field-of-view with minimal image distortion and color aberration and limit all other optical defects. Embodiments described herein utilize flexible display in two ways depending on the characteristic of its bend. One way involves displays bent continually over their whole length and the other involves displays bent in different angles in at least three different areas over their length.

Figure 33:
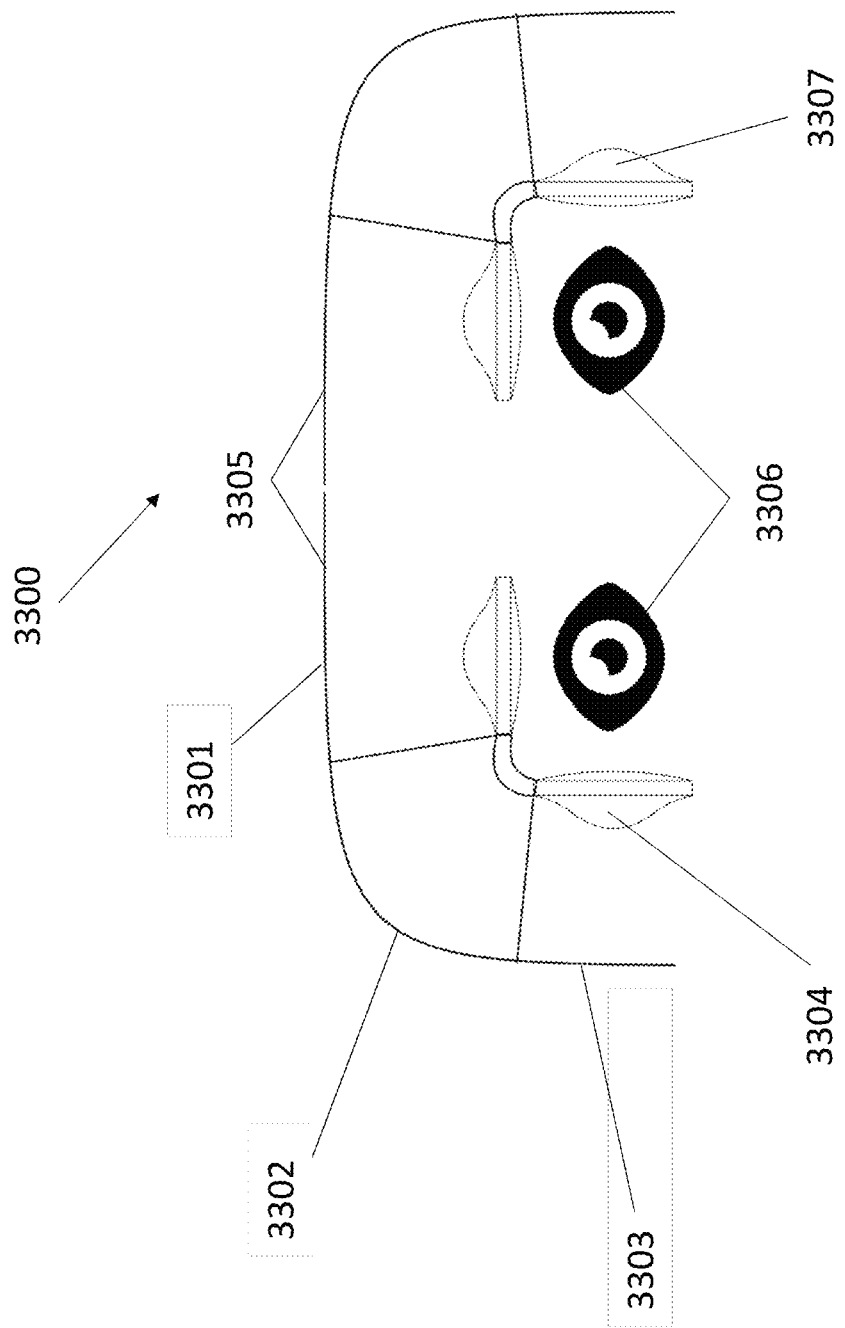
FIG. 33 illustrates a flexible-display setup for VR headsets with three different bending angles, according to embodiments of the present invention.

FIG. 33 illustrates a VR headset 3300 that may include one flexible display 3305 for each eye 3306 and special three-phase lenses 3304, 3307. Each lens 3304 and 3307 is made out of three different optical parts, where each one transfers light from different part of the flexible display 3305. Display 3305 is divided into 3 parts 3301, 3302, and 3303. First horizontal part 3301 of display 3305 is almost straight and is substantially situated in front of the eyes 3306 of a user. The display 3305 then bends into bent part 3302 that is situated substially behind the bent portion of the lens 3304. The display 3305 then bends into the vertical part 3303 that is situated substantially behind the vertical portion of the lens 3304. The vertical portion of the lens 3304 is substantially located on the side of the eyes 3306 and the horizontal portion of the lens 3304 is located is substantially located in the front of the eyes 3306. The bent part 3302 is bent at a substantially 90-degrees angle and its image is covered by thebent portion of the lens 3304. The image generated on the horizontal portion 3301 is covered by the horizontal portion of the lens 3304. The lens 3304 includes three different optical systems that compensate for each bend of the display 3305 separately. However, they form a continues and connected system.

Figure 34:
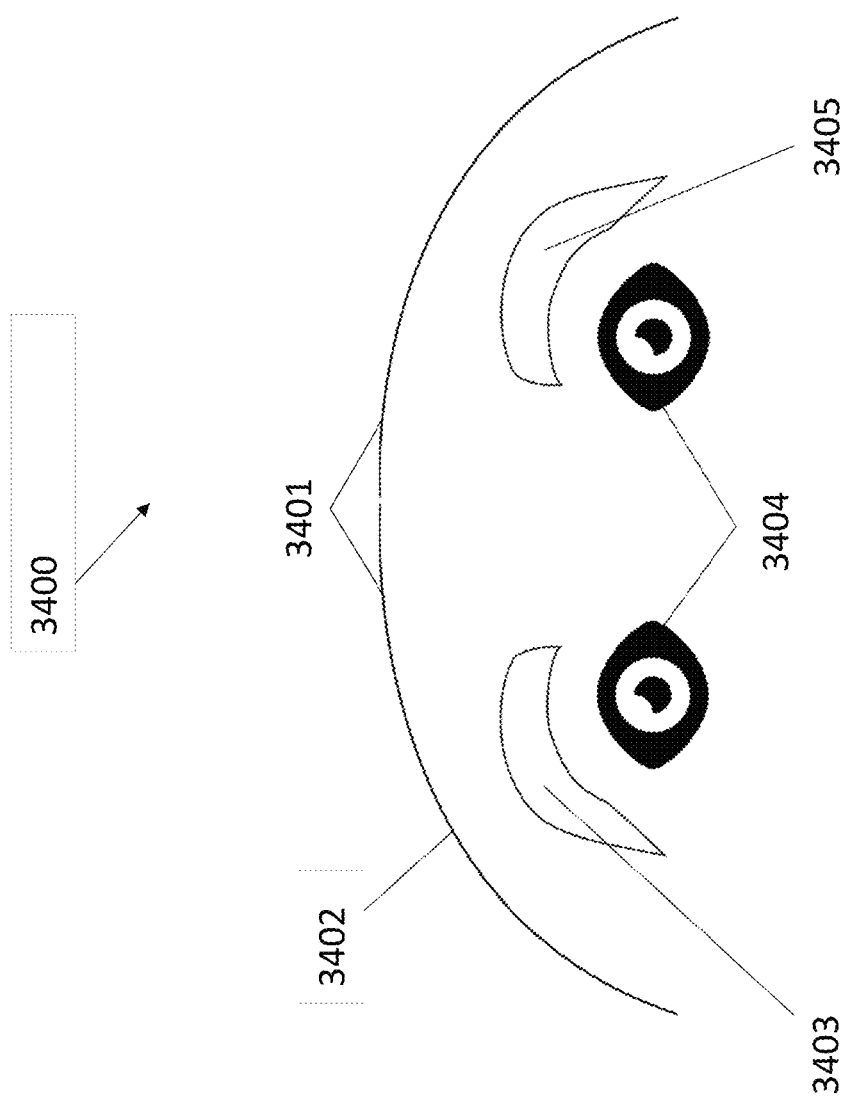
FIG. 34 illustrates a flexible-display setup for VR headsets with one continuous bend, according to embodiments of the present invention.

FIG. 34 illustrates a VR headset 3400 that may include one flexible display for each eye 3404 and special one-mold lenses 3403, 3405. The display 3401 bends in an arc-like-fashion gradually, as depicted by bent portion 3402. The lenses 3403 substantially mimic the curvature of the display 3401. The substantially same shape may minimize the image distortion and other unwanted optical effects perceived by a user's eyes 3404. Headset 3400 allows full immersion as the user can see the complete image and not the black edges of the headset 3400 in the peripheral view. By combining flexible displays 3401, unique lenses 3403, and the mechanical construction of the display and the lenses' arced structure, the headset 3400 also provides the best ratio of the field-of-view and the size of headset 3400 with the least optical defects. Such a headset assembly may be achieved using a static setup, 45-degree movement setup, standard adjustment setup, or bendable setup.

Figure 35:
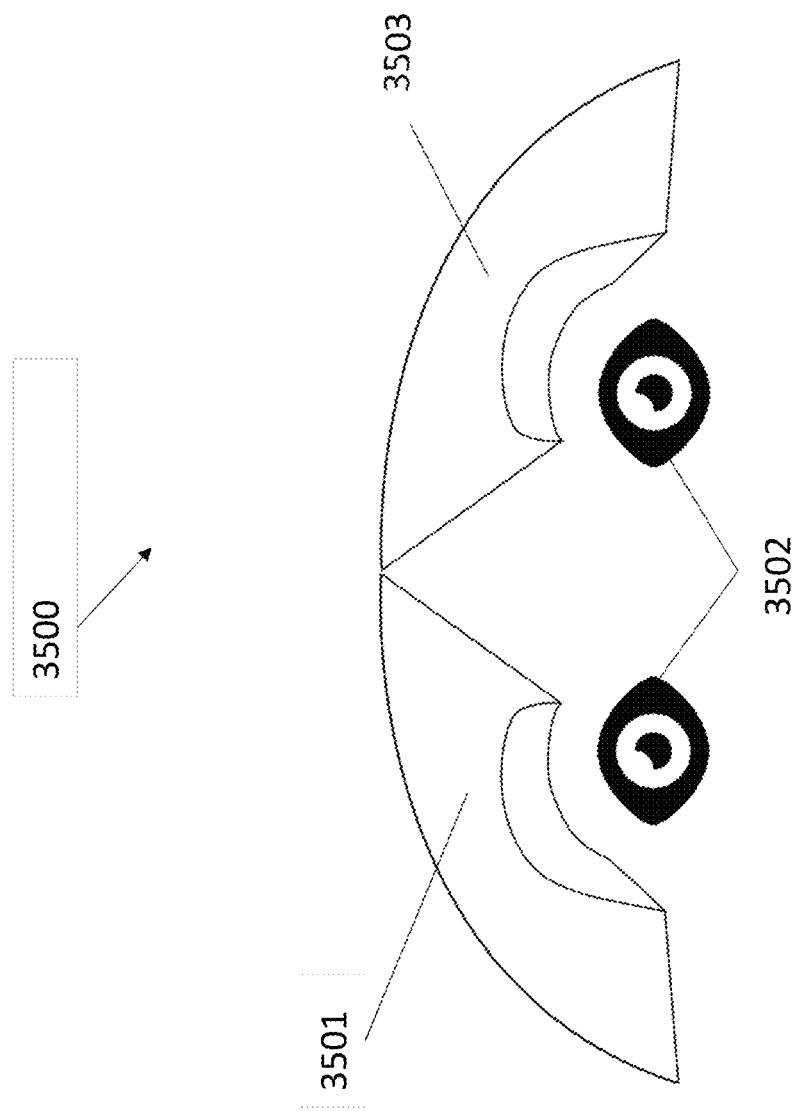
FIG. 35 illustrates a static setup for VR headsets with flexible displays, according to embodiments of the present invention.

The easiest mechanic setup is with static position of lenses against displays. Such a setup utilizes the full size of the display. The displays are positioned in the exact center of the optical system/lenses. This approach however does not allow users with any kind of vision disability to adjust or reposition the lenses, thus limiting the usage. FIG. 35 illustrates a static setup 3500 in which a display is connected to the lens 3501 on a solid frame. None of those components can move in any direction, their position is fixed with respect to the rest of VR headset (other plastic parts, electronics, etc.) and with respect to the eyes.

To compensate for vision disabilities, the distance between lenses and displays should be adjustable to adjust focus. In order to achieve ideal optical parameters, this adjustability angle needs be under 45-degrees to maintain a constant distance between every visible segment of the display and the lens.

Figure 36:
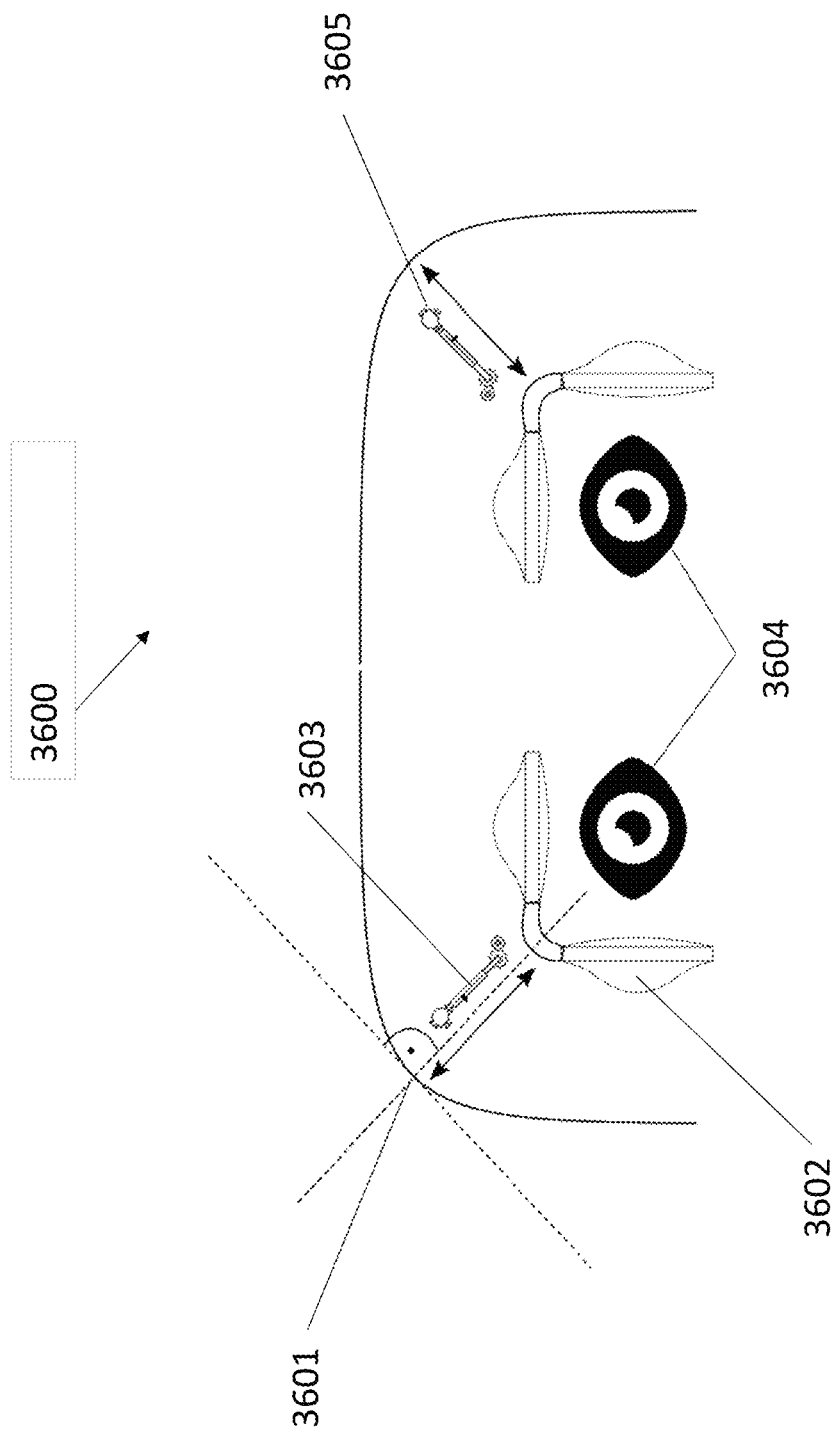
FIG. 36 illustrates a 45-degrees-movement setup for VR headsets that allows to compensate for vision disabilities, according to embodiments of the present invention.

FIG. 36 illustrates a 45-degrees movement setup 3600 in which the distance between the display 3601 and lens 3602 can be changed without any negative effect to the image quality. The display 3601 can move closer or further away from the lens 3602, or the lens 2602 can move closer or further away from the display using a manual mechanic system or by electromotors or any other actuator 3603, 3605. The crucial requirement of this system is that the movement adjustability allowed is only under 45-degrees. Under such a restricted 45-degree movement, compensation can be made to the changes in distance of every visible point as perceived by the user's eyes 3604. The 45-degree movement may be capable of being adjusted separately for each eye 3604, thus accommodating user's with different vision disability on each eye.

Standard adjustment setup allows a user to adjust interpupillary distance as well as distance between the screen and lens. Being able to adjust interpupillary distance is important because human beings have different shapes of heads and therefore different distance between centers of eyes. To get the very best experience, interpupillary distance needs to fit within the distance between the lenses of the VR headset and also the distance between the displays and lenses. Being able to adjust the interpupillary distance helps compensate for different vision disabilities.

Figure 37:
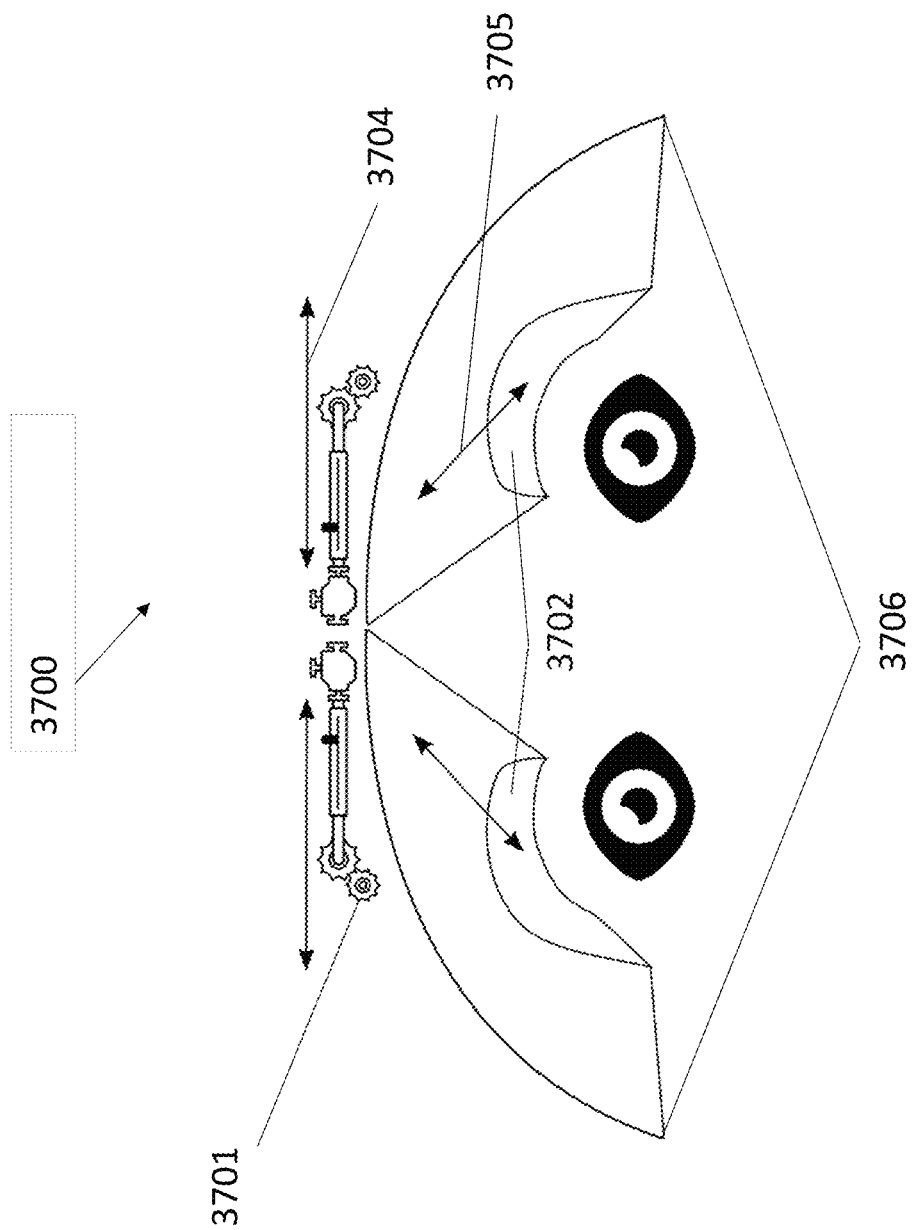
FIG. 37 illustrates a standard-adjustment setup of VR headsets that allows to compensate for vision disabilities and adjust interpupillary distance.

FIG. 37 illustrates a standard adjustment setup 3700, in which interpupillary distance 3704 can be changed as well as distance between the screen and the lens 3705. Interpupillary distance 3704 is adjustable by mechanical system 3701, which can be operated manually or by actuators. Mechanical system 3701 moves with both display and lens for same distance. Therefore, the position between lenses 3702 and displays 3706 does not change and user still see the exact same picture. The compensation for vision disabilities (focus) is operated by another mechanical system, which can be manual as well as automatic and it allows both lenses 3702 to move under the exact angle to copy the bend of flexible display 3706, thus maintaining an ideal position between the displays 3706 and lenses 3702.

In some embodiments, the VR headset may allow for adjustment of both interpupillary distance and vision disabilities (focus). These two adjustments may be connected via one mechanical system that moves with lenses, which are connected to the one end of the displays (on the edge of VR Headset). The other end of the displays (that are situated closer to a user's nose) may be static and connected to the rest of the VR headset. Thus, in some embodiments, the only way to compensate for the movement of lenses with respect to the displays is to change the displays' bending angle. By doing so, the VR headset may be able to compensate for multiple optical issues using just one set of mechanical gears, thus making the VR headset lighter and easier to adjust.

Figure 38:
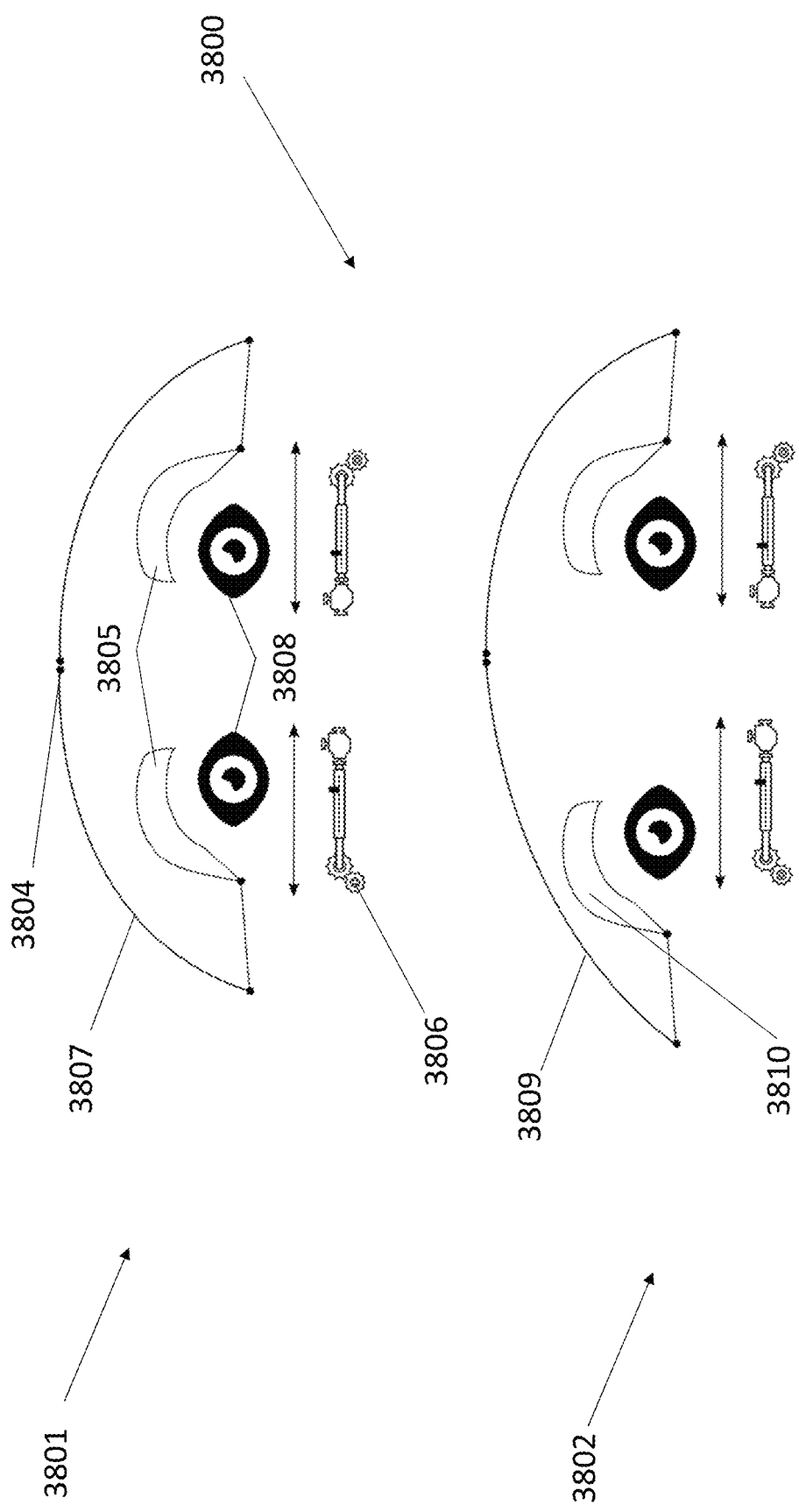
FIG. 38 illustrates a bendable setup for VR headsets that allows to compensate for vision disabilities and interpupillary distance at the same time, according to some embodiments of the present invention.

FIG. 38 illustrates a bendable setup 3800, in which the interpupillary distance is connected with compensation for vision disabilities (focus) adjustment. In the starting position 3801, the whole system is set for an average user with no vision disability. The display 3807 is fixed to the VR headset at a location 3804 on the edge closer to the user's nose. On the other side, the display 3807 is connected to the lenses 3805. The other display has a similar arrangement ss well. Lenses 3805 may move horizontally, thus facilitating the adjustment of the interpupillary distance between user's eyes 3808. This adjustment may be made manually or by using actuators 3806. This adjustment may also be made separately for each eye. As illustrated in the finishing position 3802, after the lens 3810 moves, display 3809 bends, thus changing its angle with respect to the lens and changing whole optical system. Such a movement can cause shortening of the distance between lens 3810 and display 3809 at one end and expanding the distance at a different end, thus compensating for the user's vision disabilities.

Today, the only two ways to play a VR video content is via a computer with a cable-connected VR headset or using a standalone VR headset. For both these ways, a special application is required to be installed on the side of the computer or inside the standalone VR headset. Further, the required content also needs to be downloaded or streamed from the internet. Thus, there is a need for a separate device that allows to connect any kind of video cable, such as HDMI or DisplayPort, into it and watch the VR video content inside a VR headset. A VR video transformation box is one such device. The VR video transformation box may have a processing unit and a low-level operational system, which grabs received video signal and projects it in real time to a native 360-degrees video player. Such a 360-degrees video player utilizes only a subset of whole 360-degrees sphere of where the video is being mapped; however, it adds the proper warping, thus making the video stream look natural and undistorted. The VR video transformation box may also include a digital video output for the VR headset with a USB input for accepting a quaternion (IMU, or other rotation data) to allow a user to rotate his or her head while watching the VR video. The rotation feature may be turned off in any time.

In some embodiments, the VR video transformation box may be programmed to work only with specific VR headsets, while in other embodiments, it may be able to switch between any number and kind of VR headsets. The VR video transformation box may have additional soundcards with or without a connector to connect a separate sound line to any external device. The VR video transformation box may need an additional power source, such as a battery, or may need to be connected to an electrical grid. The VR video transformation box may allow any video content to be played inside any VR headset. It may also sort out the compatibility issues with VR content. It may extend the usability of VR headsets and VR technology in general. Further, in some embodiments, the VR video transformation box allows to play any standard DVD or even VHS content the player has one of compatible VR video transformation box cables.

Figure 39:
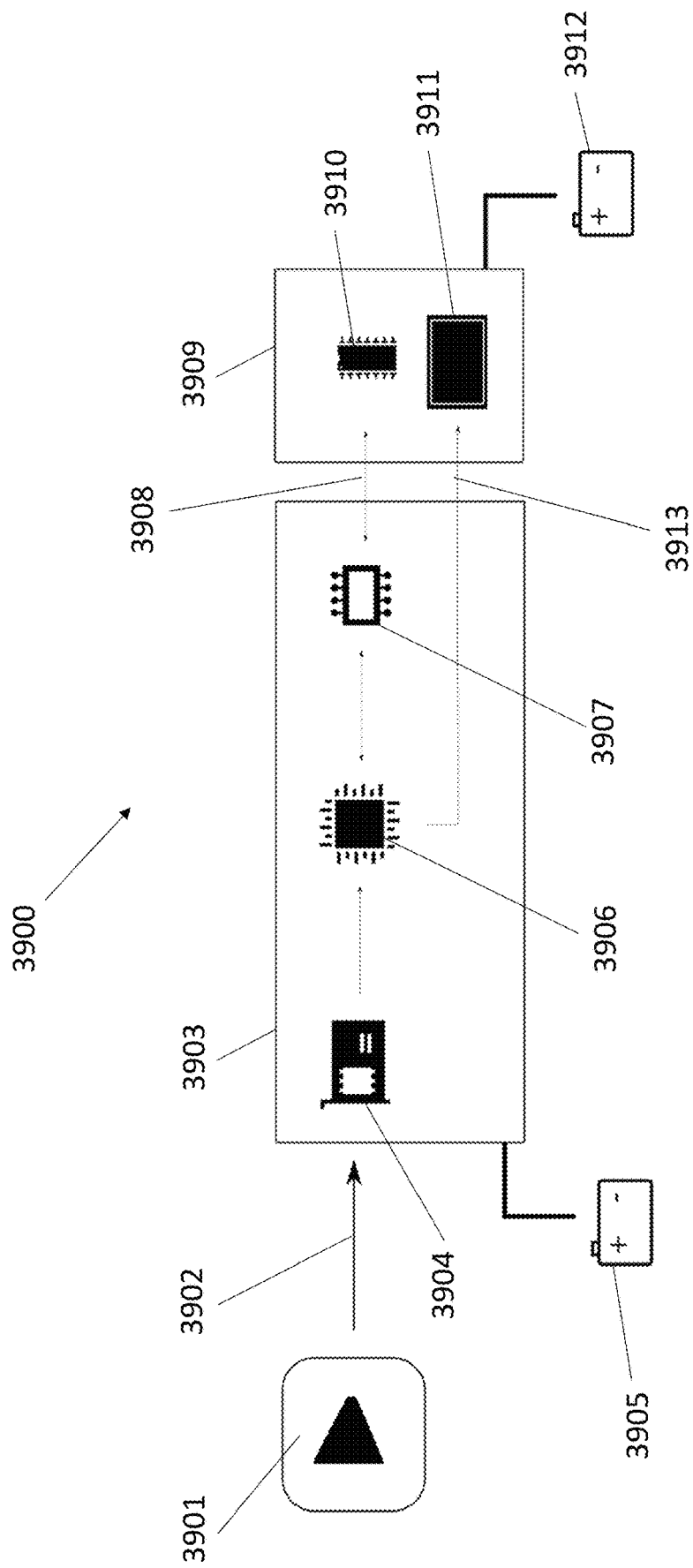
FIG. 39 illustrates a schematic diagram of a VR video transformation box, according to embodiments of the present invention.

FIG. 39 illustrates a schematic 3900 of a VR video transformation box 3903. The VR video transformation box 3903 may be communicatively linked using WiFi, Bluetooth, any kind of cable, etc., to a video source 3901. The video source 3901 may be a DVD player, game console, a computer, or any device that is capable of producing a digital video signal. The video signal may be transferred via cable 3902 or any other communicatively linking mechanism. Any kind of cable, such as HDMI, DVI, DisplayPort, USB-c or other digital cable may be used. The VR video transformation box 3903 may further consist of a camera serial interface 3904 that captures the video signal and converts it into an MIPI signal, which can be processed by a processor 3906. The processor 3906 may run on Linux operating system with a C++ video player that may be capable of projecting any image or video onto a virtual sphere, adjust its size, and rotate the sphere according to the input data. This video player may be connected to a local I/O interface 3907 that communicates with the inertial measurement unit 3910 of the VR headset 3909 via communication mechanism 3908, such as USB, cable, or wireless connection. The connection between the processor 3906 and the VR headset chip 3910 may allow the VR video transformation box 3900 to establish a connection with the VR headset 3909 and accept data about the rotation of VR headset 3909, thus allowing the video player to rotate the projection sphere and change the video signal 3913 accordingly. Such a video signal 3913 may be transferred into the VR headset 3909 and visualized on the VR headset's screen 3911. The VR headset 3909 may be powered by an external battery 3912 or remotely via one of the cables from the VR video transformation box 3903 that may also be powered by the battery 3905 or be connected to a power grid.

Eye tracking has been used for a long time in many applications in order to study user behavior, marketing analysis, and as a biometrical measurement tool. In some embodiments, eye tracking may be used as a security measure in the VR headsets to determine in real time if a user is qualified to see the content being streamed inside the VR headset.

The eye-tracking security measure may work in two different ways. The first way may have the security measure connected to the VR headset itself. This may allow for a safe way to store the biometrical footprint of a user's retina into the memory of VR headset. If the user's retina is not recognized, then the VR headset may not operate. However, this does not secure the content, but only the misusage of the VR headset. The second way may allow a user to create his or her own security key, where the private part of the key is user's retina. The private key may then need to be compiled together with the classified application (i.e., the VR content). The developers of the security measure may need to be able to add the public keys of all users allowed to see the content before it is compiled with the private key. This second way may allow adding different privileges to all 3D objects in the VR image. Each public key may need to be assigned to one of those privileges. In case a user has lower assigned privileges, some 3-D objects will not be properly decrypted for that user, thus creating an unrecognizable blur during the graphical card rendering pipeline and where the blur appears in the final VR image. The security system may track the user's eye in real time.

Location-based VR systems offer users an interesting experience inside an artificial environment. To deliver such an experience, a precise tracking solution that allows multiple users to have a simultaneous experience in a bigger area, such as hundreds of square meters, needs to be installed. Currently available location-based VR systems mainly use optical systems, which needs expensive equipment, such as infrared cameras, servers, and support infrastructure. It also consumes a significant amount of electricity to run. Thus, there is a need for better location-based VR systems. In some embodiments, the location-based VR systems allow to create a reliable, affordable, and precise tracking solution that can cover hundreds of square meters of area by using a combination of ultra-wide band waves for positional triangulation in combination with the inside-out tracking. This approach eliminates the limitations of inside-out tracking being adaptable only to smaller areas as the mathematical complexity grows with every extra meter of tracked space. It also removes the precision issue of ultra-wide band triangulation approach, thus creating a unique combination of technologies that offers convenience and affordability and allows to track VR headsets as well as all the other objects in the VR image.

Figure 40:
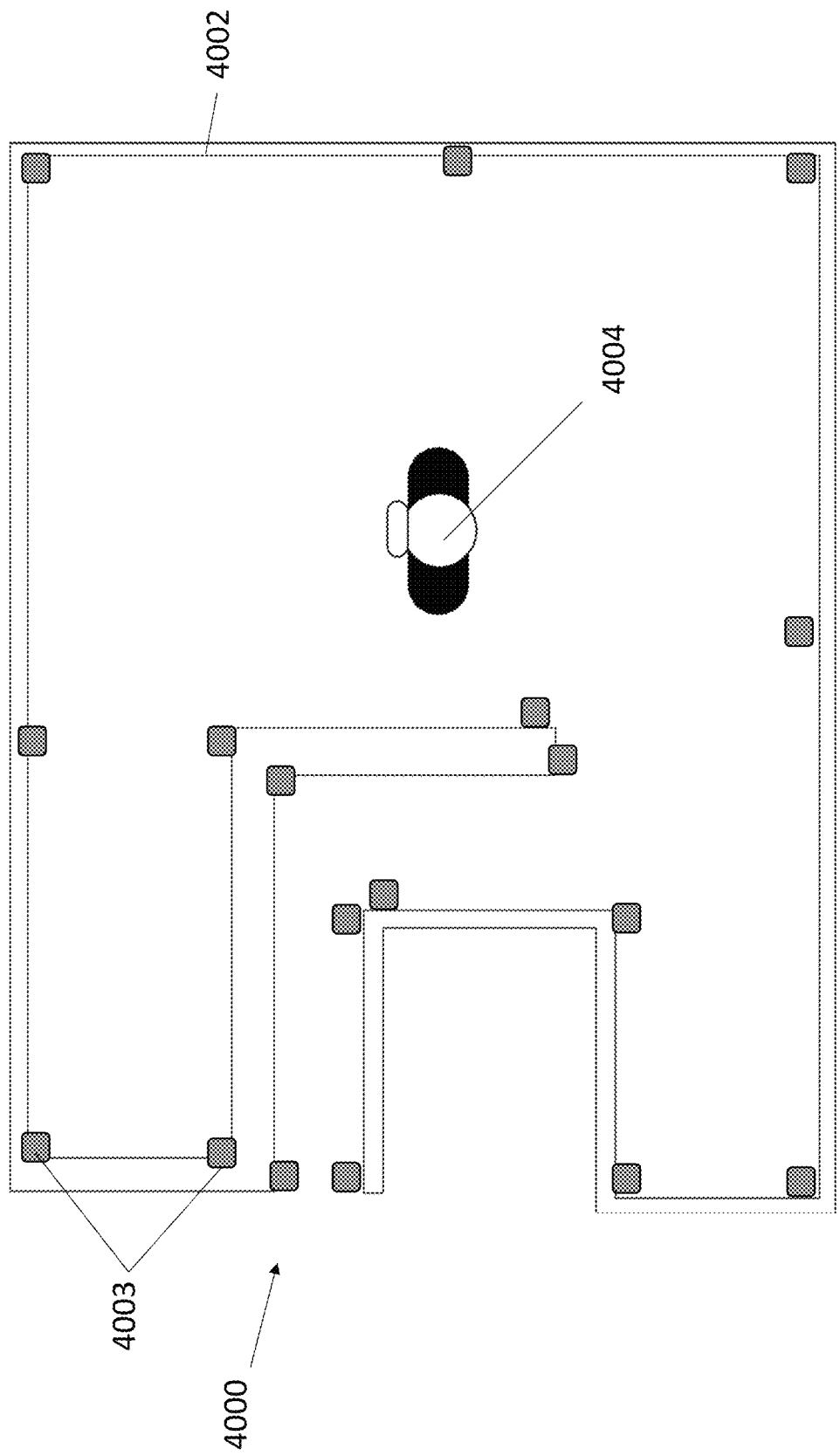
FIG. 40 illustrates an optical tracking installation for location-based VR experience.

FIG. 40 shows a map 4000 with a wall 4002 that limits the location-based experience area. The area is tracked by standard optical tracking, which is visualized by the rectangles 4003. In order to completely track such an area, around 18 cameras and cables and servers are needed. By tracking the area, the position of a user 4004, who needs to wear reflexive points on the VR headset, is computed.

Figure 41:
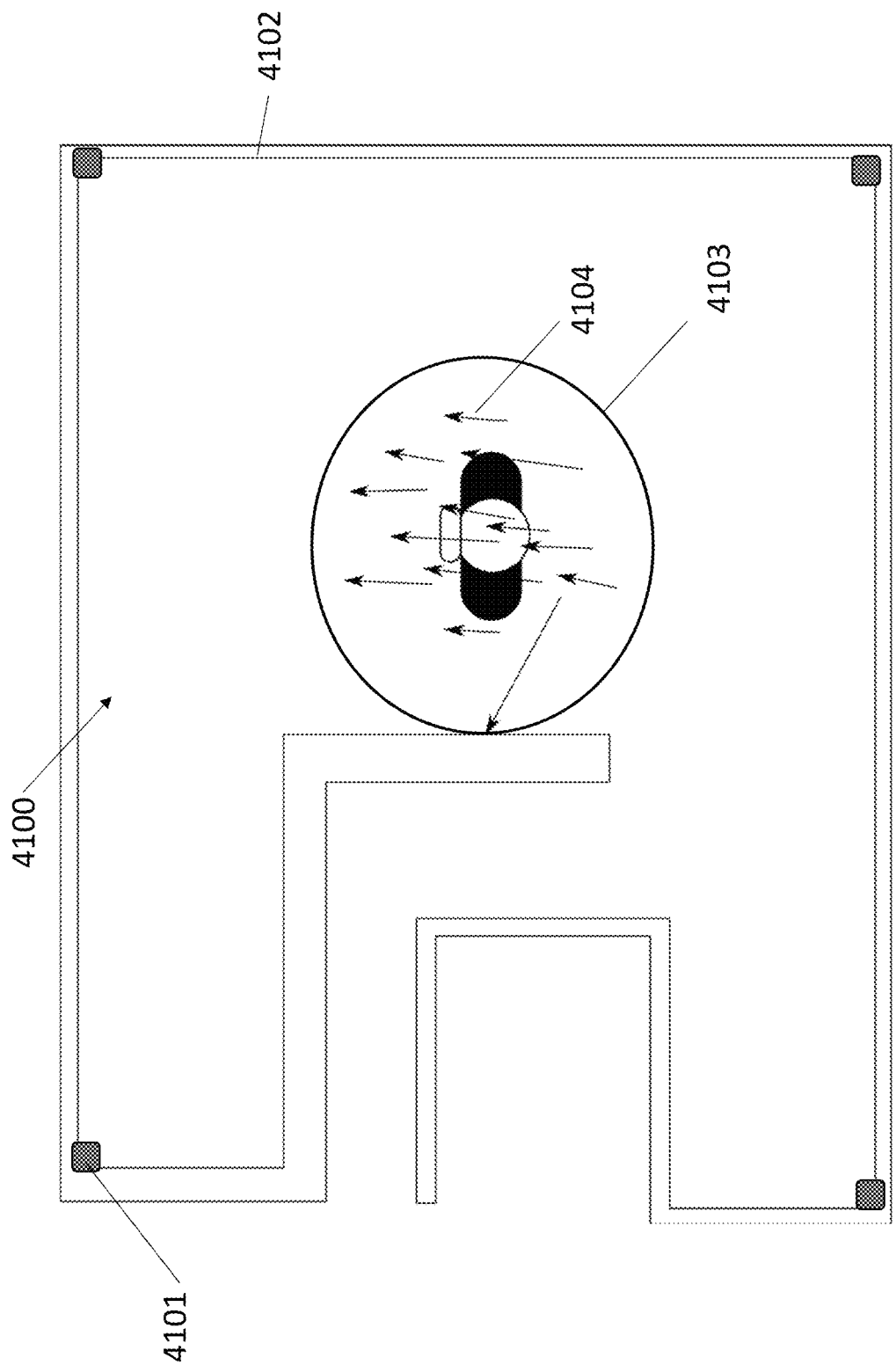
FIG. 41 illustrates an ultra-wide band tracking installation for location-based VR experience.

FIG. 41 shows a map 4100 with a wall 4102 that limits the location-based experience area. The area is tracked by ultra-wide band tracking, also known as UWB, which is visualized by beacons, illustrated for exemplary purposes as 4101. In order to completely track such an area about 4 beacons and cables and servers are needed, a number that is significantly less than cameras needed for the optical system illustrated in FIG. 40. Also, the computing power needed to analyze and calculate the user's position is much easier. However, UWB has one major flaw: tracking precision. Area 4103 depicts the tracking precision flaw in the UWB, i.e., the area where UWB determines that the user is most likely positioned. The estimations of user position made by the UWB within the area is depicted by arrows 4104. Such a low tracking precision makes UWB unusable for VR technology because VR technology needs a precise positional as well as rotational data to avoid making the user nauseated.

Figure 42:
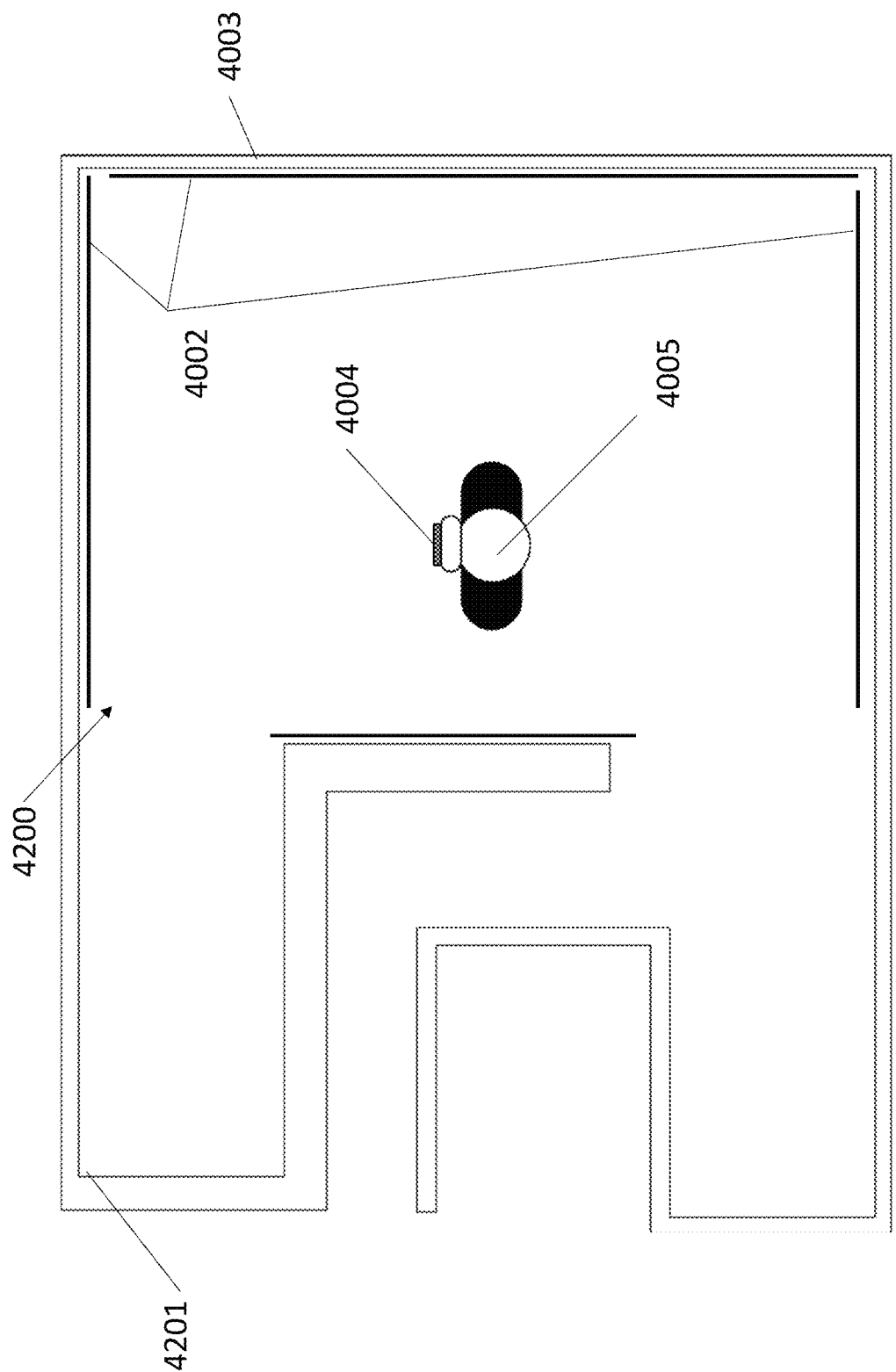
FIG. 42 illustrates an inside-out tracking installation for location-based VR experience.

FIG. 42 illustrates a map 4200 with a wall 4203 that limits the location-based experience area. The area is tracked by inside-out tracking 4004 that is positioned on the VR headset of a user 4005. In order to completely track such an area and determine the user's location, only one sensor and one computer is needed, thus making inside-out tracking the most affordable solution. However, such a tracking is limited because it depends upon determining a visual match of the user's new position based on the previously determined dataset of the user's previous position. Thus, as the user moves, the previously determined dataset grows, thus causing significant delay in determining the new position of the user. Thus, inside-out tracking provides precise relative information about the position, rotation, and movement of users, but operates in a limited space 4002.

Figure 43:
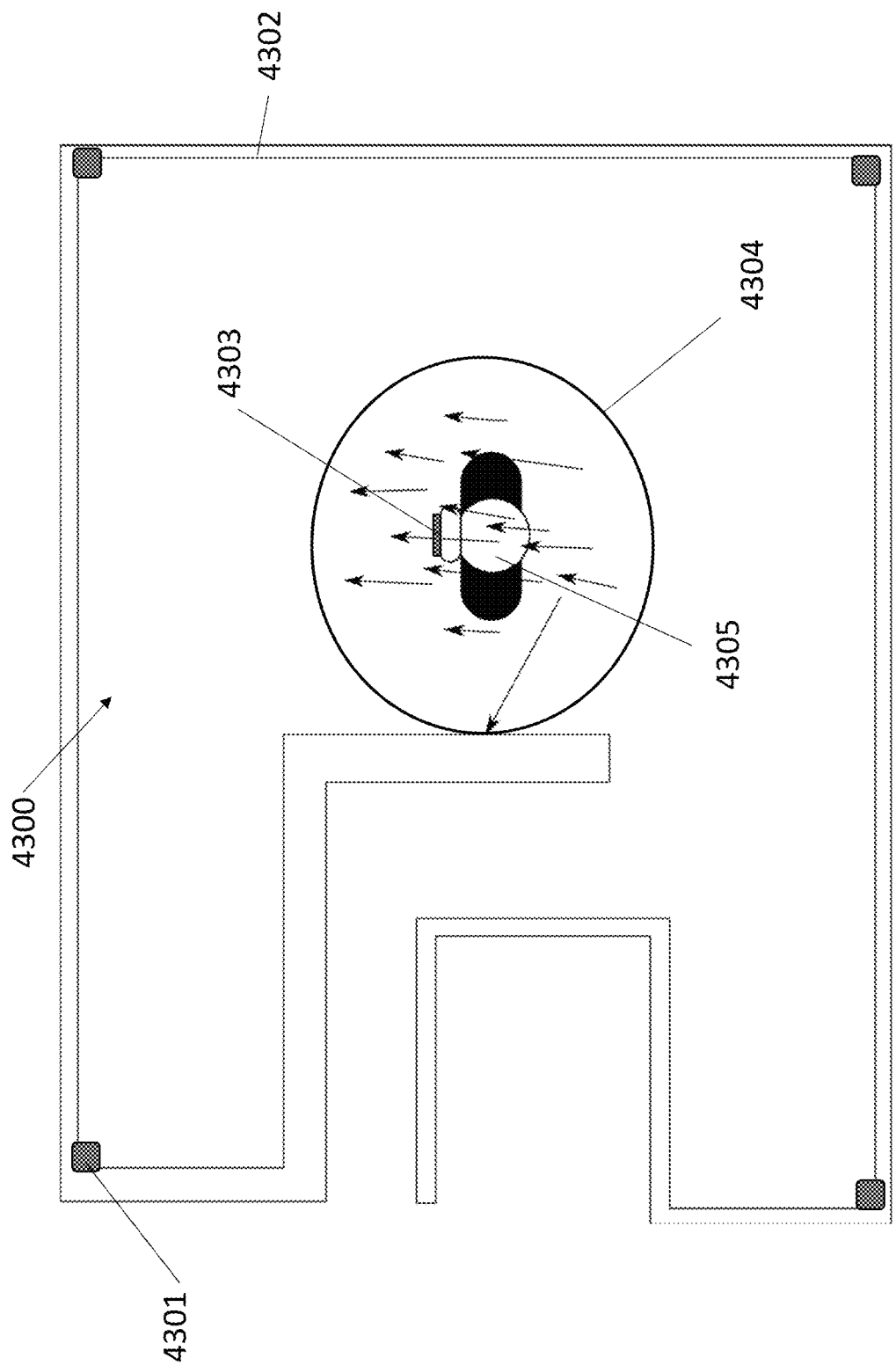
FIG. 43 illustrates a unique combination of the inside-out tracking and ultra-wide band tracking installation for location-based VR experience, according to embodiments of the present invention.

FIG. 43 shows a map 4300 with a wall 4302 that limits the location-based experience area. The area may be tracked by UWB tracking depicted as blue rectangle beacons 4301 in conjunction with the inside-out tracking 4303. While the UWB tracking 4301 provides the information about the approximate position of a user 4305 inside the blue circle 4304, the inside-out tracking 4303 detects the exact location of the user 4305 wearing the VR headset. By using both tracking mechanisms, the dataset of the user's position may be exchanged in real time, thus limiting the amount of data that needs to be searched and matched as the user moves. In other words, the real time data exchange occurs for each new location of the user. This tracking mechanism allows to determine the precise location of a user and also avoid making the user feel nauseated.

As used herein, the term "and/or" placed between a first entity and a second entity means one of (1) the first entity, (2) the second entity, and (3) the first entity and the second entity. Multiple entities listed with "and/or" should be construed in the same manner, i.e., "one or more" of the entities so conjoined. Other entities may optionally be present other than the entities specifically identified by the "and/or" clause, whether related or unrelated to those entities specifically identified. Thus, as a non-limiting example, a reference to "A and/or B," when used in conjunction with open-ended language such as "comprising" can refer, in one embodiment, to A only (optionally including entities other than B); in another embodiment, to B only (optionally including entities other than A); in yet another embodiment, to both A and B (optionally including other entities). These entities may refer to elements, actions, structures, steps, operations, values, and the like.

What is claimed is:

1. A virtual or augmented reality device system comprising:
    at least one visualization device;
    at least one first external computer,
        wherein the at least one first external computer is communicatively linked to the at least one visualization device,
        wherein the at least one first external computer further comprises a central processing unit and a video adaptor,
        wherein the video adaptor supplies multiple data stream to the at least one visualization device;
    at least two displays coated with semi-permeable infrared reflecting layer to enhance reflection, wherein the at least two displays are connected to the at least one visualization device;
    an automatically adjustable focus;
    at least one left lens and one right lens positioned in front of the at least two displays, wherein the least one left lens and one right lens are connected to an adjustable pupillary distance mechanism which is connected to a pupillary distance measurement sensor providing feedback of lenses position, and wherein the adjustable pupillary distance mechanism is connected to lens actuators;
    at least two eye tracking systems connected to the lens actuators and wherein the least two eye tracking systems further comprise at least two eye tracking cameras that use the at least two displays as a mirror, and provide information about a center of pupils; and
    wherein the pupillary distance measurement sensor and the at least two eye tracking systems are connected to at least one of the at least one first external computer and a second computer for setting a center of the at least one left lens and one right lens in front of the center of pupils, and the at least one of the at least one first external computer and the second computer for setting the center of the at least one left lens and one right lens is further connected to the adjustable pupillary distance mechanism.

2. The virtual or augmented reality system of claim 1, wherein the at least one visualization device further comprises at least one dedicated video splitter.

3. The virtual or augmented reality system of claim 1, wherein the at least one visualization device further comprises at least one direct external video connection, at least one graphical adaptor, and at least one processing unit.

4. The virtual or augmented reality system of claim 1, wherein the at least one first external computer provides at least one video signal.

5. The virtual or augmented reality system of claim 2, wherein the at least one visualization device switches between at least two video signals.

6. The virtual or augmented reality system of claim 1, wherein the actuators adjust the position of the at least two displays.

7. The virtual or augmented reality system of claim 1 further comprising at least one contact lens.

8. The virtual or augmented reality system of claim 1 further comprising at least three IMUs positioned on different axes.

9. The virtual or augmented reality system of claim 1 further comprising:
    at least one XR/AR module,
        wherein the at least one XR/AR module further comprises two front-facing cameras positioned adjustably, and wherein the two front-facing cameras are distinct from the at least two eye tracking cameras.

10. The virtual or augmented reality system of claim 9, wherein the front-facing cameras are wide field-of-view cameras.

11. The virtual or augmented reality system of claim 1, wherein the at least two displays are flexible.

12. The virtual or augmented reality system of claim 11, wherein the at least one left lens and one right lens substantially mimic the curvature of the at least two displays.

13. The virtual or augmented reality system of claim 11 wherein the at least one left lens and one right lens, at one end, are connected to the respective at least two displays.

14. The virtual or augmented reality system of claim 1, wherein the automatically adjustable focus works using servomotors.

15. The virtual or augmented reality system of claim 1, wherein the at least two eye tracking systems are connected to actuators of display.

16. The virtual or augmented reality system of claim 1, wherein a left lens of the at least one left lens and one right lens is connected to at least one left actuator and a right lens of the at least one left lens and one right lens is connected to at least one right actuator for adjusting of position of lenses.

* * * * *